United States Patent
Inoue et al.

(10) Patent No.: US 10,461,545 B2
(45) Date of Patent: Oct. 29, 2019

(54) BATTERY SYSTEM

(71) Applicant: Hitachi Chemical Company, Ltd., Chiyoda-ku, Tokyo (JP)

(72) Inventors: Takeshi Inoue, Tokyo (JP); Keizo Yamada, Tokyo (JP); Tetsuya Matsumoto, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 377 days.

(21) Appl. No.: 15/319,137

(22) PCT Filed: Jun. 15, 2015

(86) PCT No.: PCT/JP2015/067107
§ 371 (c)(1),
(2) Date: Dec. 15, 2016

(87) PCT Pub. No.: WO2016/002485
PCT Pub. Date: Jan. 7, 2016

(65) Prior Publication Data
US 2017/0141589 A1    May 18, 2017

(30) Foreign Application Priority Data
Jun. 30, 2014  (JP) ................................. 2014-133495

(51) Int. Cl.
*H02J 7/00* (2006.01)
*H02J 5/00* (2016.01)
(Continued)

(52) U.S. Cl.
CPC ............ *H02J 7/0014* (2013.01); *B60L 50/40* (2019.02); *B60L 53/60* (2019.02); *B60L 58/12* (2019.02);
(Continued)

(58) Field of Classification Search
CPC ........ H02J 7/0014; H02J 7/0068; B60L 53/60
(Continued)

(56) References Cited

U.S. PATENT DOCUMENTS

2007/0188130 A1* 8/2007 Scheucher ............ B60L 53/305
320/110
2010/0318252 A1* 12/2010 Izumi ..................... B60L 58/20
701/22
(Continued)

FOREIGN PATENT DOCUMENTS

CN        101944756 A    1/2011
CN        103718424 A    4/2014
(Continued)

OTHER PUBLICATIONS

Partial English-language translation of S. Adachi et al., "Fundamentals of Kalman Filter," Tokyo Denki University Press, Mar. 10, 2013, first edition second printing (eleven (11) pages).
(Continued)

*Primary Examiner* — Edward Tso
*Assistant Examiner* — Aaron Piggush
(74) *Attorney, Agent, or Firm* — Crowell & Moring LLP

(57) ABSTRACT

In a battery system that connects a plurality of types of batteries through a switch SW, when the switch SW is switched at a voltage (charge rate), it has been possible to increase a stored charge during charging, depending on the DC resistance of the battery. An object of the present invention is to provide switch SW switching control so that the stored charge can further be increased. A first feature of the present invention is to provide a battery system in which a first battery and a second battery are connected in parallel through the switch SW, including an estimator which estimates the charging current by measuring the resistance and OCV of each battery. The battery system can further increase the stored charge by switching to a switch SW combination that can increase the stored charge.

8 Claims, 20 Drawing Sheets

(51) Int. Cl.

| | |
|---|---|
| *H02J 7/02* | (2016.01) |
| *H02J 7/04* | (2006.01) |
| *H02J 7/34* | (2006.01) |
| *B60R 16/033* | (2006.01) |
| *H02P 1/00* | (2006.01) |
| *H02P 9/00* | (2006.01) |
| *H02J 7/14* | (2006.01) |
| *B60L 50/40* | (2019.01) |
| *B60L 53/60* | (2019.01) |
| *B60L 58/12* | (2019.01) |
| *B60L 58/20* | (2019.01) |

(52) U.S. Cl.
CPC ............ *B60L 58/20* (2019.02); *B60R 16/033* (2013.01); *H02J 5/00* (2013.01); *H02J 7/00* (2013.01); *H02J 7/007* (2013.01); *H02J 7/0068* (2013.01); *H02J 7/02* (2013.01); *H02J 7/04* (2013.01); *H02J 7/1423* (2013.01); *H02J 7/34* (2013.01); *H02P 1/00* (2013.01); *H02P 9/008* (2013.01); *B60L 2240/545* (2013.01); *B60L 2240/547* (2013.01); *B60L 2240/549* (2013.01); *B60Y 2300/91* (2013.01); *B60Y 2400/112* (2013.01); *Y02T 10/7005* (2013.01); *Y02T 10/7022* (2013.01); *Y02T 10/7044* (2013.01); *Y02T 10/7066* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC .................. 320/104, 119, 126, 158, 159
See application file for complete search history.

(56) References Cited

U.S. PATENT DOCUMENTS

| | | | |
|---|---|---|---|
| 2012/0161708 A1* | 6/2012 | Miura | ................ B60L 11/1866 |
| | | | 320/118 |
| 2012/0276440 A1 | 11/2012 | Ishishita et al. | |
| 2014/0091767 A1 | 4/2014 | Tamura et al. | |
| 2014/0117756 A1 | 5/2014 | Takahashi et al. | |
| 2014/0117934 A1 | 5/2014 | Kurikuma et al. | |

FOREIGN PATENT DOCUMENTS

| | | | |
|---|---|---|---|
| JP | 2004-222473 A | | 8/2004 |
| JP | 3716776 B2 | | 11/2005 |
| JP | 2010-94016 A | | 4/2010 |
| JP | 2010-115050 A | | 5/2010 |
| WO | WO 2012/147121 A1 | | 11/2012 |
| WO | WO 2013/118612 A1 | | 8/2013 |

OTHER PUBLICATIONS

Partial English-language translation of Aira et al., "System Identification," The Society of Instrument and Control Engineers, 1981 (nine (9) pages).

F. Chapeau-Blondeau, "Numerical Evaluation of the Lambert W Function and Application to Generation of Generalized Gaussian Noise With Exponent ½," IEEE Transactions on Signal Processing, Sep. 2002, pp. 2160-2165, vol. 50, No. 9.

International Search Report (PCT/ISA/210) issued in PCT Application No. PCT/JP2015/067107 dated Sep. 8, 2015 with English-language translation (two (2) pages).

Japanese-language Written Opinion (PCT/ISA/237) issued in PCT Application No. PCT/JP2015/067107 dated Sep. 8, 2015 (three (3) pages).

\* cited by examiner

| SOC [%] | OCV [V] |
|---------|---------|
| 0 | 3.0 |
| 10 | 3.1 |
| 20 | 3.2 |
| 30 | 3.3 |
| 40 | 3.4 |
| 50 | 3.5 |
| 60 | 3.6 |
| 70 | 3.7 |
| 80 | 3.8 |
| 90 | 4.0 |
| 100 | 4.2 |

FIG. 9

| SOC [%] | r [mΩ] | c [F] |
|---|---|---|
| 0 | 2.0 | 500 |
| 10 | 1.2 | 500 |
| 20 | 1.0 | 400 |
| 30 | 1.0 | 400 |
| 40 | 1.0 | 400 |
| 50 | 1.0 | 300 |
| 60 | 1.0 | 300 |
| 70 | 1.0 | 300 |
| 80 | 1.2 | 400 |
| 90 | 1.3 | 500 |
| 100 | 1.5 | 600 |

FIG. 10

| SOC [%] | R [mΩ] |
|---|---|
| 0 | 2.0 |
| 10 | 1.2 |
| 20 | 1.0 |
| 30 | 1.0 |
| 40 | 1.0 |
| 50 | 1.0 |
| 60 | 1.0 |
| 70 | 1.0 |
| 80 | 1.2 |
| 90 | 1.3 |
| 100 | 1.5 |

FIG. 11

| TEMPERATURE [°C] | R [mΩ] |
|---|---|
| -30 | 0.7 |
| -10 | 0.9 |
| 0 | 1.0 |
| 10 | 1.2 |
| 20 | 1.5 |
| 25 | 2.0 |
| 40 | 3.0 |
| 60 | 4.0 |

| PARAMETERS | LEAD ACID BATTERY | LITHIUM ION CAPACITOR |
|---|---|---|
| OCV INITIAL VALUE [V] | 12.6 | 8.8 |
| INITIAL VALUE OF POLARIZATION VOLTAGE [V] | 0 | – |
| DC RESISTANCE [Ω] | 0.005 | 0.01 |
| POLARIZATION RESISTANCE [Ω] | 0.013 | – |
| CAPACITY [F] | – | 200 |
| POLARIZATION CAPACITY [F] | 307.69 | – |

BATTERY SYSTEM

TECHNICAL FIELD

The present invention relates to a battery system that supplies power to an electrical load, and relates to an electrical storage system configured with two secondary batteries.

BACKGROUND ART

As an example of the energy management system, in recent vehicles, a micro hybrid electric vehicle (hereinafter, referred to as a micro HEV) has been developed with a function that, in addition to an idling stop function, converts a regenerative energy during a deceleration into an electrical energy by a generator (alternator) to charge a battery so that the battery is used as a power source of auxiliary equipment such as headlights and heater which is an electrical load. Here, a lead acid battery and another type of battery (hereinafter, referred to as a sub battery) are sometimes used as the secondary battery of the recent micro HEV. This is in order to recover more regenerative energy. As for the sub battery used in three types of vehicles, an open circuit voltage (hereinafter referred to as OCV) is substantially the same as that of the lead acid battery. Thus, it is possible to prevent a current exchange between the batters (hereinafter referred to as a cross current), even when the two batteries of the lead acid battery and the sub battery are connected in parallel.

However, when a battery with different OCV from the lead acid battery is used for the sub battery, a cross current occurs, resulting in a loss and thus unable to recover a sufficient regenerative energy. In particular, the cross current is significant when a capacitor (although not exactly a battery but an electrical storage device, this will be referred to as a battery in this specification) with an excellent temperature resistance and lifetime that can increase the charging current is used for the sub battery.

In order to prevent the cross current, there is a method for inserting a DC-to-DC converter between the lead acid battery and the sub battery. However, this method leads to higher costs. Thus, to achieve lower costs, as a hard configuration (not limited to the micro HEV), there may be considered a method or preventing the cross current by inserting a switch SW into each of the lead acid battery and the sub battery in series to connect the batteries in parallel, in accordance with the method described in Patent Document 1 (Japanese Unexamined Patent Application Publication No. 2010-115050).

As the switch SW switching method, Patent Document 1 discloses a method of switching the switch SW so that the charge rate of the main battery and the charge rate of the sub battery are even with each other. Further, Patent Document 2 discloses a switching method by a voltage variation.

CITATION LIST

Patent Documents

Patent Document 1: Japanese Unexamined Patent Application Publication No. 2010-115050
Patent Document 2: Japanese Patent No. 3716776

SUMMARY OF INVENTION

Technical Problem

However, as shown in. Patent Document 1, when the charge rate of the lead acid battery (hereinafter referred to as the first battery) and the charge rate of the sub battery (hereinafter referred to as the second battery) are obtained from values of a voltage and a current to determine which battery is to be charged based on the result, it could be determined that the amount of charge is sufficient, even if the amount of charge is not sufficient, depending on a resistance of the battery. In this case, the battery is susceptible to further absorbing charge. In particular, when the charge is switched among a plurality of batteries with different properties such as capacity and resistance like the micro HEV (for example, a lead acid battery and a lithium ion secondary battery), there is a problem that only the lithium ion secondary battery is charged. In other words, even if the voltage of the lithium ion secondary battery increases, the resistance is small compared to the lead acid battery, so that the charge is not switched to the lead acid battery and there has been room for improvement in the total amount of charge of the first and second batteries.

An object of the present invention is to provide a battery system that can improve the total amount of charge even if the first battery and the second battery have different properties.

Solution to Problem

The present invention includes the following aspects.

There is provided a battery system that connects a first battery and a second battery in parallel through a switch SW, the battery system including: a means which estimates a charging current of the first battery at least from an internal resistance of the first battery; and a means which estimates a charging current of the second battery at least from an internal resistance of the second battery. The battery system switches the switch SW by a procedure in which a sum of a stored charge of the first battery and a stored charge of the second battery is increased, based on the charging current of the first battery and the charging current of the second battery.

Further, in the battery system, the switch SW includes a first switch SW and a second switch SW. The first switch SW and the second switch SW are connected in parallel. The first battery is connected to a load through the first switch SW. The second battery is connected to the load through the second switch SW.

During the discharge, the battery system first discharges the second battery, and when the second battery reaches a predetermined voltage or a charge rate, switching to the first battery to discharge the first battery. On the other hand, the battery system first discharges the first battery, and when the first battery reaches a predetermined voltage or a charge rate, switching to the second battery to discharge the second battery.

In the battery system, the procedure is to switch the switch SW once during a regenerative charging. The battery system first charges the second battery under an assumption that a regeneration time is T, a charging time of the second battery is $\tau$ ($T>\tau$), and a first charging time is $T-\tau$. Then, the battery system switches the switch SW to the first battery at the timing $\tau$ at which a charge amount of the first battery and a charge amount of the second battery are the maximum.

In the battery system, $\tau$ is a time t from a start of charge, in which $i1(t)=i2$ (a charge completion time−t) by estimating a current time series of the first battery ($i1(t)$) and a current time series of the second battery ($i2(t)$). The battery system first charges the second battery, and switches the switch SW so as to select the first battery after t has elapsed from the start of charge.

When the regenerative charging time T is unknown, the battery system obtains a time t at which the current time series of the first battery is equal to the current convergence value of the second battery, and defines the time t as the τ.

In the battery system, the procedure is to switch the switch. SW two or more times during a regenerative charging. The battery system compares an estimated charging current of the first battery with the estimated charging current of the second battery, and switches the switch SW so as to select the battery with the larger of the two estimated currents.

The battery system switches the switch SW at regular intervals to charge each battery until the individual charging of either the first battery or the second battery attains to a constant voltage charge.

When the first battery is charged with a constant current, the battery system initially sets a time rate of the switch SW of the first battery to 1. Then, after the first battery is in a constant current charge completion state, the battery system changes the time rate of the switch SW of the first battery to (voltage in constant voltage charging of alternator—open circuit voltage of first voltage)/(current of alternator during constant current charging×polarization resistance).

In the battery system, the load is an alternator. When the first battery is charged with a constant current, the battery system controls the time rate of the switch SW of the first battery so that the following equation is true: Current in constant current charging of alternator=Polarization voltage of second battery/(polarization resistance of second battery*(1+polarization capacity of second battery/capacity of second battery))+Polarization voltage of first battery vp(t)/Polarization resistance of first battery.

In the battery system, the procedure is to switch the switch SW two or more times during a regenerative charging. When switching the switch SW two or more times while permitting a simultaneous connection during a charging, the battery system estimates the charging current of the first battery and the charging current of the second battery for three cases: an individual charging of the first battery; an individual charging of the second battery; and connection to both of the first and second batteries. When the first battery or the second battery discharges, the battery system switches the switch SW so as to connect the battery with the larger of the two charging currents between the first and second batteries, and otherwise, when a constant voltage charging takes place with the battery alone, the battery system connects both the first and second batteries. Further otherwise, the battery system controls the rate of the switch SW ON time of the first battery alone, the rate of the switch SW ON time of the second battery alone, and the rate of the switch SW time for connecting both batteries, in order to perform a constant current charging.

In the battery system, the rate of the switch SW ON time of the first battery alone, the rate of the switch SW ON time of the second battery alone, and the rate of the switch SW time for connecting both batteries are set to a predetermined value.

With respect to the rate of the switch SW ON time of the first battery alone, the rate of the switch SW ON time of the second battery alone, and the rate of the switch SW for connecting both batteries, the battery system sets the rate of the switch SW time for connecting both batteries to 0. First, the battery system initially sets the rate of the switch SW of the first battery to 1. After the first battery is in a constant current charge completion state, the battery system changes the rate of the switch SW time of the first battery as follows: (voltage in constant voltage charging of alternator-open circuit voltage of first battery)/(current in constant current charging of alternator×polarization resistance).

With respect to the rate of the switch SW ON time of the first battery alone, the rate of the switch SW ON time of the second battery alone, and the rate of the switch SW time for connecting both batteries, the battery system sets the rate of the switch. SW for connecting both batteries to 0. Then, the battery system controls the time rate of the switch SW time of the first battery so that the following equation is true: Current in constant current charging of alternator=Polarization voltage of second battery/polarization resistance of second battery*(1+polarization capacity of second battery/capacity of second battery (F equivalent)))+Polarization voltage of first battery/Polarization resistance of first battery.

The battery system includes a means which measures a voltage and current of the first battery, a voltage and current of the second battery, and a voltage of the alternator and auxiliary equipment. The battery system measures the DC resistance of the first battery, the resistance of the switch SW, the polarization capacity, the polarization resistance, the polarization voltage, the open circuit voltage, and the capacity of the second battery.

The battery system obtains the DC resistance of the battery as well as the resistance of the switch SW from the change in the voltage and current before and after the switch SW changes from ON to OFF, or before and after the switch SW changes from OFF to ON. Further, the battery system obtains the open circuit voltage of the battery as Battery voltage−DC resistance×Current.

The battery system estimates parameters on-line from the current time series and voltage time series of the battery so that the polarization resistance, the polarization capacity, and the capacity of the second battery satisfy a given circuit equation.

The battery system estimates the parameters as Polarization voltage=−Polarization voltage before measurement time×(1−measurement time step size/(polarization resistance×polarization capacity))+Measurement time×Measurement time step size/Polarization capacity.

The battery system defines the open circuit voltage of the battery to be in a steady state as Measured (or Unsteady) open circuit voltage−Polarization voltage.

The battery system previously holds a relationship between the open circuit voltage of the battery to be in a battery steady state, and the charge rate of the battery. The battery system obtains the initial charge rate of the battery from the voltage when the system started, and updates the charge rate by adding Current integral value/Battery capacity (Ah). Then, the battery system further obtains the steady-state open circuit voltage from the charge rate.

The battery system defines the polarization volt=age of the battery as follows: Measured battery voltage−DC resistance×Measured current−Open circuit voltage in steady state battery.

The battery system transmits a current with which the battery system can charge, to the upper controller through a communication line.

In the battery system, a charging start signal, a current during constant current charging, and a voltage during constant voltage charging are transmitted to the battery system from an upper controller through the communication line.

In the battery system, the time from the start of charging to its completion is transmitted to the battery system from the upper controller through the communication line, along with the start of charging.

Advantageous Effects of Invention

According to the present invention, it is possible to provide a battery system that can improve the total amount of charge even if the first battery and the second battery have different properties.

BRIEF DESCRIPTION OF DRAWINGS

FIG. 9 is a diagram showing an example of a table of a polarization resistance and capacity of the battery.

FIG. 10 is a diagram showing an example of a table of DC resistance of the battery.

FIG. 11 is a diagram showing an example of a table of the switch SW

DESCRIPTION OF EMBODIMENTS

Hereinafter, preferred embodiments of the present invention will be described in detail with reference to the accompanying drawings. However, the present invention is not limited to the embodiments described below, and various modifications and applications are also included in the scope of the technical idea of the present invention. For example, the embodiments described below can also be applied not only to HEV, XEMS (HEMS, BEMS) but also to electrical storage systems mounted on electric vehicles and railroad cars, by changing the battery voltage.

Figure 1:
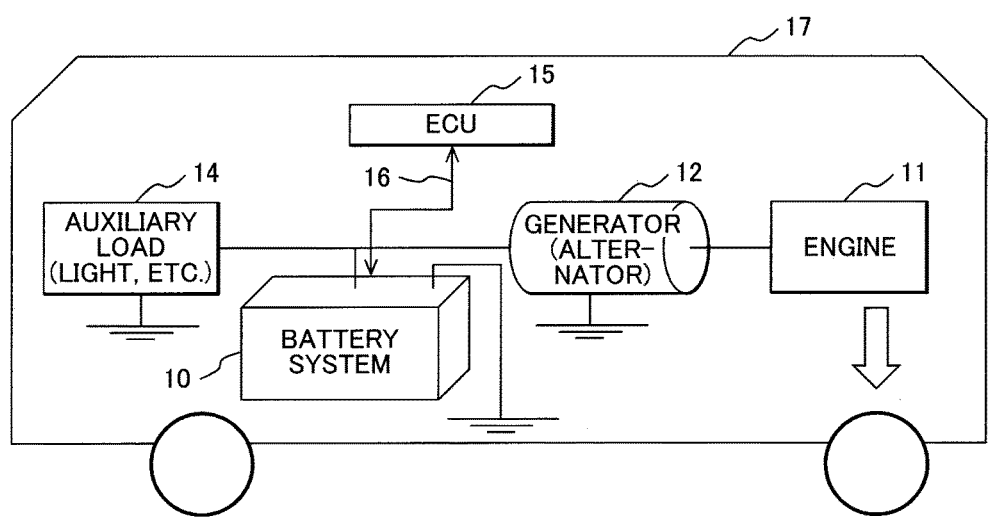
FIG. 1 is a schematic block diagram of a micro HEV mounted provided with a battery system to which the present invention is applied.

FIG. 1 is a schematic configuration of a micro HEV.

In FIG. 1, a micro HEV 17 is provided with a battery system 10 (a pack configured with two types of secondary batteries, for example, a lead acid battery and another battery also including a capacity, which will be described below). The micro HEV 17 includes: an engine 11; a generator 12 (alternator) that is mechanically connected to the engine 11; auxiliary load 14 which is the electrical load such as a light, an air-conditioner fan, and a starter; an ECU 15 which is the upper controller; and a communication line 16.

Here, the power of the auxiliary load 14 of the micro HEV 17 is supplied from the battery system 10 when idling is stopped. Then, in the deceleration of the vehicle, the alternator 12 is rotated and operated by the rotational force (deceleration energy) of the tires that is generated due to the vehicle coasting. The electrical energy generated by the alternator 12 is supplied to the auxiliary load 14 as power, and at the same time, is used to charge the secondary battery within the battery system 10. Here, it is assumed that the voltage of the alternator 12 is the rated voltage of the auxiliary load 14 (for example, 14 V). Note that the alternator generally serves as constant current power supply. However, when the voltage reaches a predetermined value, it is controlled to a fixed voltage (14 V for a normal vehicle). In other words, the alternator is considered as a CCCV (Constant Current Constant Voltage) charger. Further, the ECU controls the alternator ON/OFF and the mechanical brake in the regeneration. At the same time, the ECU transmits the charging current to the power supply system.

Figure 2:
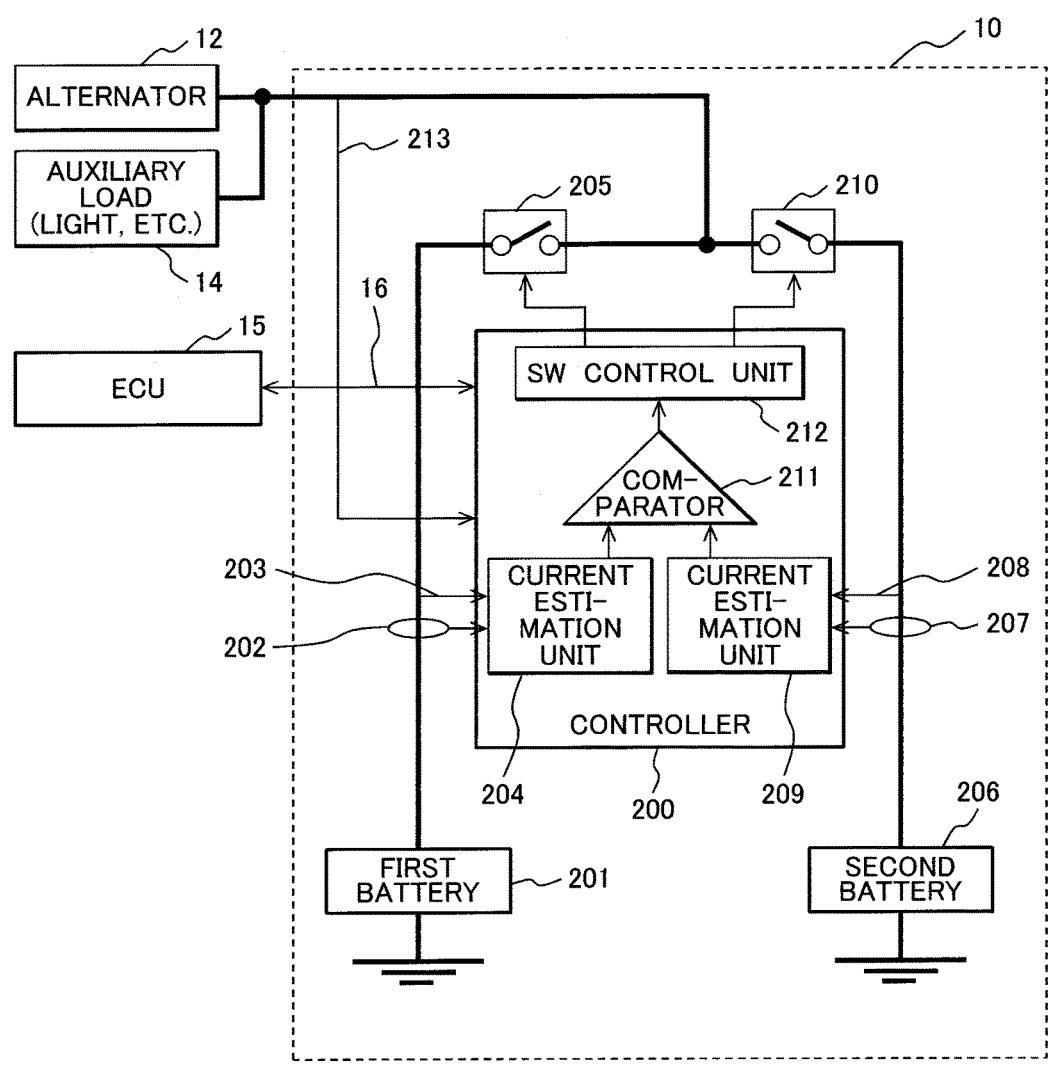
FIG. 2 is a schematic block diagram of the battery system according to the present invention.

FIG. 2 is a schematic block diagram of the battery system according to the present invention.

The battery system 10 includes: a first battery (generally a lead acid battery) 201; an ammeter 202 for monitoring the current of the first battery; a voltage sensing line 203 for monitoring the voltage of the first battery; a current estimation unit 204 for estimating the current of the first battery; a switch SW205 that is connected to the first battery in series; a second battery 206; an ammeter 207 for monitoring the current of the second battery; a voltage sensing line 208 for monitoring the voltage of the second battery; a switch SW210 that is connected to the second battery in series; a comparator 211 for comparing the currents; a switch control unit 212 for generating a signal to control the switch SW; and a voltage sensing line 213 of the alternator and auxiliary equipment.

The controller 200 is provided with the switch control unit 212, the comparator 211, and the current estimation units 204 and 209. The controller 200 controls the ON/OFF state of the switch SW205 and the switch SW210, in accordance with the current and voltage of each current as well as information from the upper controller 16 through a signal line 18. Due to this switching of the switch SW, the battery system can switch the current from the generator 12 to allow it to flow either through the first battery or the second battery.

Here, the device that directly controls the signal of the switch SW is the switch control unit 212 within the controller 200. The first battery can be used for the power supply of the controller 200. Further, the loss of the auxiliary power supply is prevented by prohibiting both the switch SW205 and the switch SW210 from being turned off. In addition, for the switch SW205 and the switch SW210, a power MOSFET, an IGBT, or a mechanical relay can be used.

According to the mechanism described above, the first battery 201 and the second battery 206 discharge so as to supply power to the auxiliary load 14 in a certain state.

Further, the first battery 201 and the second battery 206 are charged with the electrical energy generated by the generator 13 in the deceleration of the micro HEV 17.

For the first battery 201 and the second battery 206, the storage devices such as a lead acid battery, a nickel hydride battery, a nickel-zinc battery, a lithium ion battery, an electric double-layer capacitor, and a lithium ion capacitor can be used.

In general, a lead acid battery is used for the first battery 201. The reason of this is that a battery with a large capacity (Ah) is required to provide enough power for a protective device, or the like, when parking for a long time.

Further, for the second battery 206, a capacitor that is generally designed to able to charge with more of a current, a lithium ion capacitor, a lithium ion battery, a nickel-zinc battery, or a nickel hydride battery can be used. Note that the rated voltage of the lithium ion capacitor and the lithium ion battery is in the range of 3 V to 4.2 V, so that the batteries are used in a four-series connection to keep the voltage in the range of 8 V (the reference voltage of an audio sound skipping) to 14 V, which is the reference of the vehicle voltage range. In the case of the nickel hydride battery, ten batteries are used. In the case of the nickel-zinc battery, eight to ten batteries are used. In the case of the capacitor, seven capacitors are used.

As described above, in general, the capacity type battery or electrical storage device that focuses on the capacity (Ah), such as a lead acid battery, are used for the first battery 201, while the power type batteries that can provide power, such as a lithium ion battery and a capacitor, is used for the second battery 206. However, the present invention is not limited to this example, and the same type of batteries can be used for the first battery 201 and the second battery 206.

For the ammeter 202 of the first battery and for the ammeter 307 of the second battery, a Hall element or a shunt type ammeter can be used.

According to the present invention, in a battery system in which the first battery 201 and the second battery 206 are connected in parallel through the switch SW, for example, in the battery system 10, an estimator for estimating the charging current by calculating the resistance and OCV of each battery is required, thus allowing the battery system to switch to a combination of switch ON/OFF so as to increase an overall stored charge for each battery.

The battery system is not designed to switch the switch SW based on the result of the ammeter provided in each battery, but is designed to switch the switch SW between the first battery 201 and the second battery 206 based on the information obtained by the estimator for estimating the charging current by calculating the resistance an OCV of each battery. Thus, it is possible to provide a battery system that can improve the total amount of charge even if the first battery and the second battery have different properties such as resistance and capacity.

Here, each of three embodiments will be described below in terms of the determination of switch SW combination to increase the stored charge. Note that the user can select among the following three embodiments.

In the first embodiment, the battery system first selects either the first battery 201 or the second battery 206 and charges the selected battery during regeneration. Then, the battery system switches the switch SW to charge the other battery. In other words, the battery system switches the switch SW only once from the start of the regeneration to its completion. As for the switching timing, for example, the battery system estimates the current time series when only one battery is connected. And the battery system compares the times series $I(T-\tau)$ with $i(\tau)$, where $I(t)$ is the current time series of the first battery and $i(t)$ is the current time series of the second battery. And the battery system obtains the solution T of non-liner equations so that the two time series are equal. After $\tau$ has elapsed from the regeneration, the battery system switches to the first battery from the second battery (T is a regeneration time).

In the second embodiment, it is designed to perform switching two or more times from the start of the regeneration to its completion. The battery system obtains the estimated current of the first battery and the estimated current of the second battery at regular intervals. Each time, the battery system switches to either the first battery or the second battery with the larger of the two estimated currents. Here, when the battery is put into a constant current charging mode, the current is the same even when the battery system connects to the first battery or the second battery, so that the following method can be applied. When the battery is opened, the battery system first performs CC charge on the battery whose voltage drops fast (hereinafter referred to as the fast depolarizing battery). Then, the battery system alternately switches the switch SW between the first and second batteries so that the OCV of the fast depolarizing battery is constant. In this way, it is possible to use the recovery from the battery voltage drop by means of the depolarization. As a result, the charging time is increased and the stored charge is further increased.

In the third embodiment, the battery system performs switching two or more times during the time from the start of the regeneration to its completion. At the same time, the battery system can connect both batteries so as to charge the batteries simultaneously. After the completion of the CC charge described in the second embodiment, the battery system turns the switches of the two batteries. Further, at this time, the battery system constantly monitors a cross current. When a cross current occurs, the battery system combines control such as immediately turning on the switch SW only for the battery in which the charging current is increased, in order to prevent the cross current.

In the fourth embodiment, the battery system controls to reduce the number of switching times of the switch SW, although both the first and second batteries can be connected by turning on the first and second switches. After the completion of the CC charge described in the third embodiment, the battery system first charges one of the batteries. At this time, the battery system charges to a voltage at which no cross current occurs even if the batteries are connected in parallel. Then, the battery system connects the batteries in parallel if no cross current occurs even with the parallel connection.

In the fourth embodiment, the battery system controls to reduce the number of switching times of the switch SW, although both the first and second batteries can be connected by turning on the first and second switches. After the completion of the CC charge described in the third embodiment, the battery system first charges one of the batteries. At this time, the battery system charges to a voltage at which no cross current occurs even when the batteries are connected in parallel. Then, the battery system connects the batteries in parallel if no cross current occurs even with the parallel connection.

As described in the first and second embodiments, when the first and second batteries are not connected simultaneously, one switch can be provided at an intersection of the first and second batteries which are connected in parallel. The number of switches may be plural. On the other hand, in the case of the third and fourth embodiments that allow for simultaneous connection, the switch includes the first switch and the second switch. The first switch SW and the second switch SW are connected in parallel like the first battery and the second battery are. The first battery is connected to the load (auxiliary load 14, alternator 12, and the like) through the first switch SW. The second battery is connected to the load through the switch SW.

Further, according to the present invention, the battery system does not turn on both batteries in discharge in order to prevent a cross current, while reducing the OCV of the second battery in the next regeneration. Then, the battery system first discharges the second battery in discharge so as to increase the regenerative charging. At the time, when the second battery reaches a predetermined voltage or charge rate, the battery system switches to the first battery and discharges. Or, the battery system first discharges the first battery, and when the first battery reaches a predetermined voltage or charge rate, switches to the second battery and discharges. However, when the engine is started (cranking), a very large current of 300 A is required. As a result, sufficient power may not be supplied only by the first battery and the cranking may be disabled. In this case, it is possible to connect the first and second batteries in parallel to compensate the lack of power, or it is also possible to change the connection to the first battery from the second battery.

Hereinafter, the first to third embodiments will be described in detail including the entire control.

First Embodiment

Figure 3:
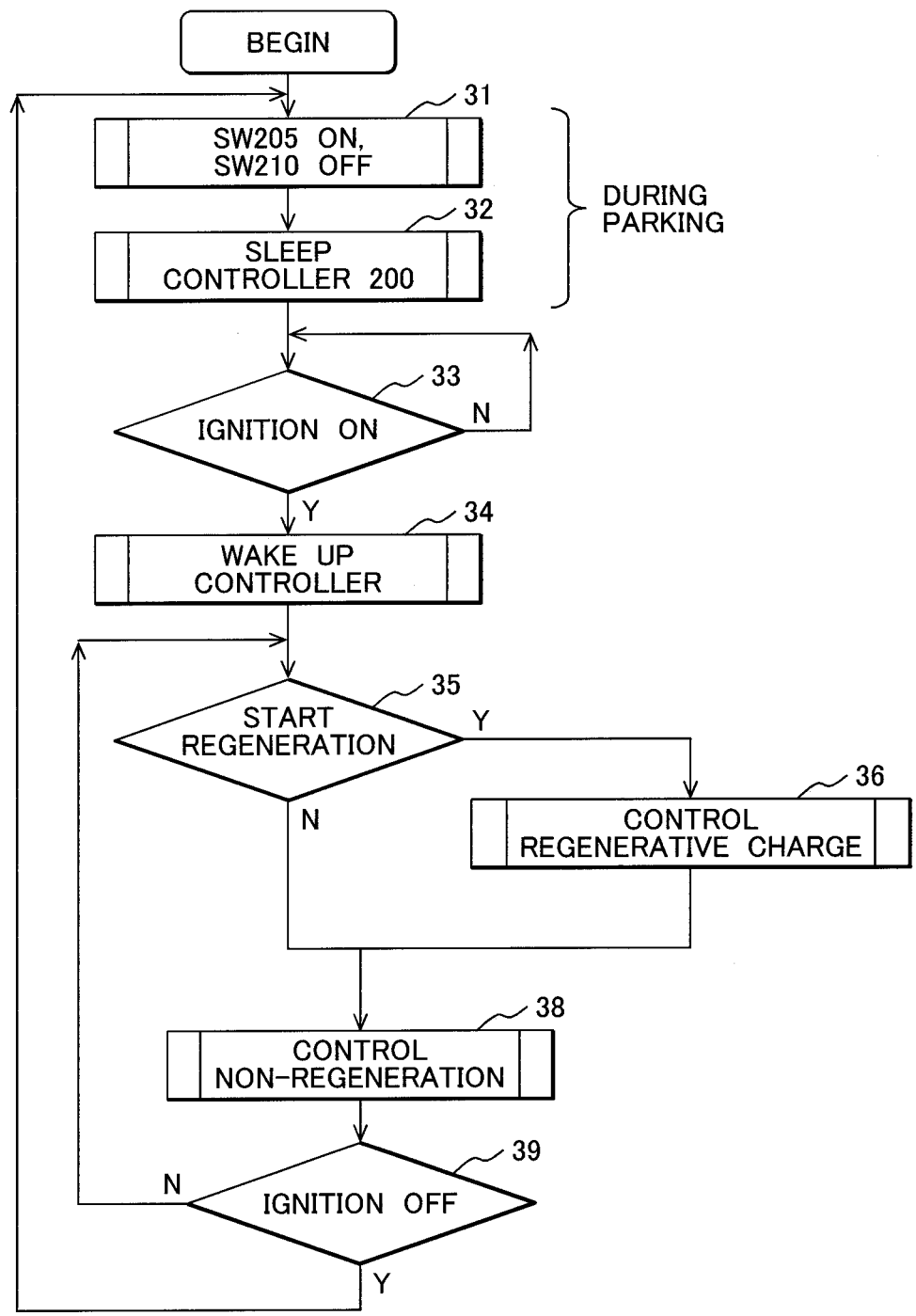
FIG. 3 is a diagram of the entire process of the battery system to which the present invention is applied.

FIG. 3 schematically shows the entire process of control during ignition ON and OFF or during parking, after shipment from the factory or after the first battery is exchanged.

First of all, in step 31, regarding the vehicle being parked, the battery system turns on the switch SW205 and turns off the switch SW210. In step 32, the battery system puts the controller 200 into a sleep mode, allowing the first battery to supply power to the protective device during parking. Then, the battery system moves to a low power consumption mode.

This process continues until the ignition switch is turned on. In determination 33, when the ignition is turned ON, the battery system moves the process to step 34 to wake up the controller.

Next, in step 35, the battery system determines whether the regeneration is started. This determination is made by a signal from the ECU 16. After the regeneration is started, the battery system moves the process to regenerative charging control of step 36. The details of this process are described in another embodiment. When step 36 is completed, the battery system moves the process to non-regeneration control step 37. Then, if the ignition-ON state continues as a result of the determination in step 39, the battery system moves the process to step 35. If the ignition is turned off, the battery system moves the process to step 31 which is the process during parking. Note that the signal of the ignition switch obtains information from the ECU 16.

The process from step 35 to step 39 can be effective or determined in the event of control cycle (for example, 10 ms or 0.1 s) at regular intervals. Further, the process of FIG. 3 is a process that continues until the vehicle is discarded or until the first battery is exchanged.

Figure 4:
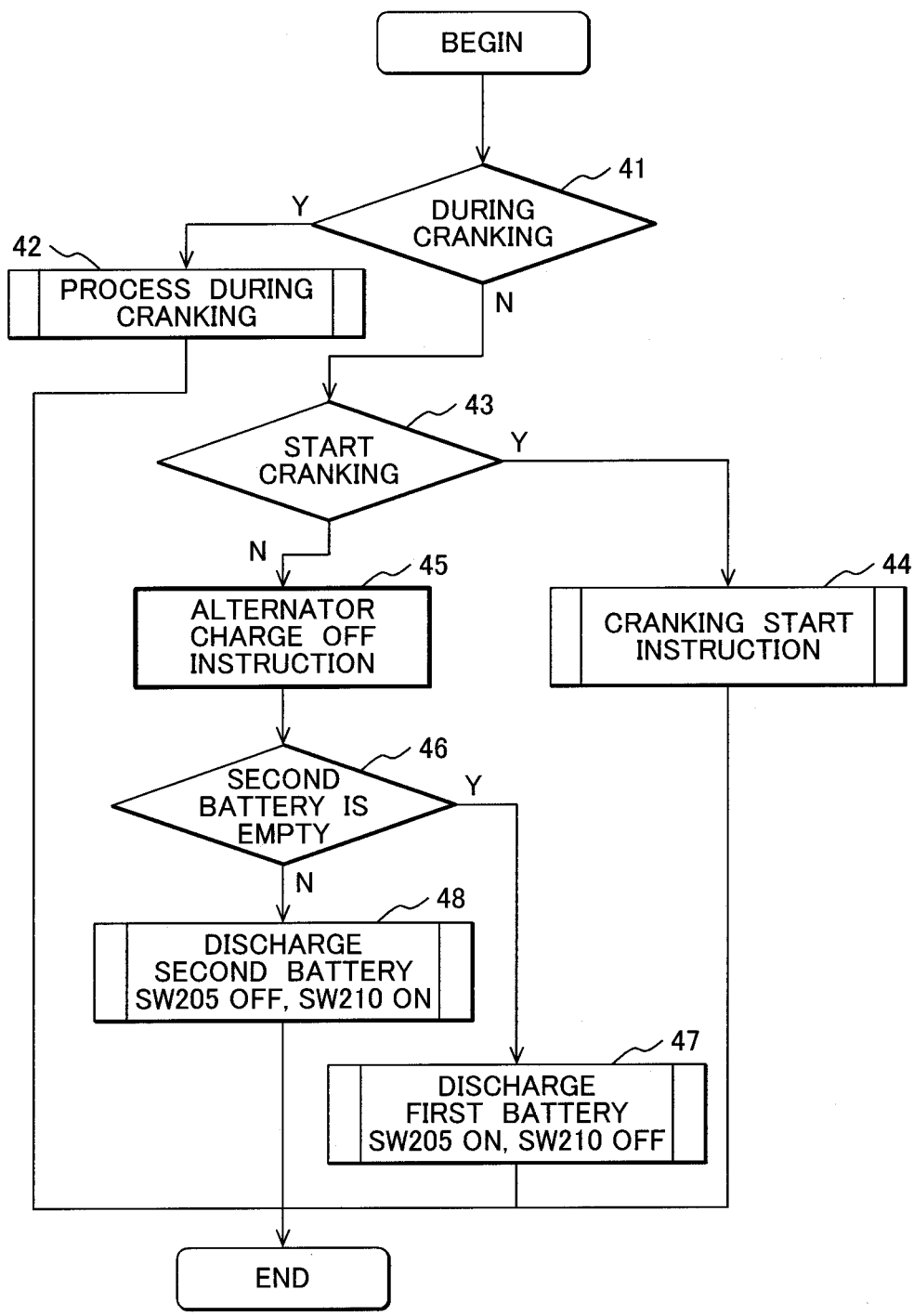
FIG. 4 is a diagram of a process of the battery system during a non-regeneration time.

In FIG. 4, the non-regeneration control 37 in FIG. 3 is described. The non-regeneration control 37 is divided into two modes, a discharge mode and a forced charge mode. The discharge mode can be divided into three types of processes: when the charge stored in the second battery after regenerative charging is large; when the second battery is empty and only the first battery is used; and cranking. The forced charge mode takes place when both batteries are empty and the first battery is forcibly charged. This process is described using the example of FIG. 4. Note that the process of FIG. 4 is riot performed during the regeneration or when the regeneration is started.

First, in step 41, the battery system determines whether the engine is cranking. If cranking, the battery system moves the process to an engine cranking process 42. If the engine is not cranking, the battery system moves the process to step 43. The battery system obtains information from the ECU 15 to determine whether the engine is cranking.

In step 42, the battery system performs the switch SW process during cranking. This process will be described later. After completion of step 42, the battery system ends the process of FIG. 4.

In step 43, the battery system determines whether the state is cranking start. If cranking start, the battery system moves the process to step 44. If not cranking start, the battery system transmits an alternator charge OFF instruction to the ECU 15 in step 45 (this is in order to prevent deterioration of fuel consumption due to an extra increase in the output of the alternator in terms of fuel saving). Here, the cranking start is the state caused by the vehicle's side (for example, when the room temperature increases during idling stop because the air compressor is stopped during idling stop), or the state in which the first battery is empty in the battery system 10 and a need arises to forcibly charge the first battery. In the case of the craning start caused by the vehicle' side, the battery system obtains the information from the ECU 15. Whether or not the first battery is empty can be determined under the assumption that the charge rate of the first battery is less than or equal to a predetermined charge rate. The predetermined charge rate can be, for example, 80% or 90% when a lead acid battery is used for the first battery. As another method for determining whether the first battery is empty, the determination can be based on the assumption that the voltage of the first battery is less than or equal to a predetermined voltage. The predetermined voltage can be set to 12.4 V or 12.6 V. Note that in the alternator charge OFF, it is possible to stop the alternator, or it is possible to adjust the power generation voltage of the alternator so that the voltage is equal to the OCV of the battery (in this case, a power generation voltage adjustment function of the alternator is required). With respect to the adjustment of the power generation voltage of the alternator, it is possible to provide the current (the sum of 202 and 206) measured by the ammeters to the ECU 15 to perform voltage control using feedback by the ECU 15. After completion of step 45, the battery system moves the process to step 46.

In step 44, the battery system turns on the switch SW205 of the first battery and turns off the switch SW210 of the second battery to prepare for cranking. Note that the current state of the switch SW can be maintained. After completion of step 44, the battery system ends the process of FIG. 4.

In step 46, the battery system determines whether the second battery is empty. As for the determination method, the determination can be based on the assumption that the voltage of the second battery is less than or equal to a predetermined voltage. The predetermined voltage can be as follows: Rated voltage of second voltage×Number of second batteries connected in series, or can be a voltage at which an audio sound skipping occurs, for example, 8 V. When the second battery is empty, the battery system moves the process to step 47. If the second battery is not empty, the battery system moves the process to step 48.

In step 47, the battery system turns on the switch SW205 and tunes off the switch SW210 in order to discharge the first battery. After completion of step 47, the battery system ends the flow of FIG. 4.

In step 48, the battery system turns on the switch SW205 and turns off the switch SW210 in order to discharge only the second battery. This process is to make the second battery empty as much as possible in discharge, with the intention to allow the second battery to absorb a charging current as much as possible in the next regeneration. After completion of step 48, the battery system ends the flow of FIG. 4.

Although the flow of FIG. 4 is an example of first discharging the second battery, it is also possible to first discharge the first battery.

Figure 5:
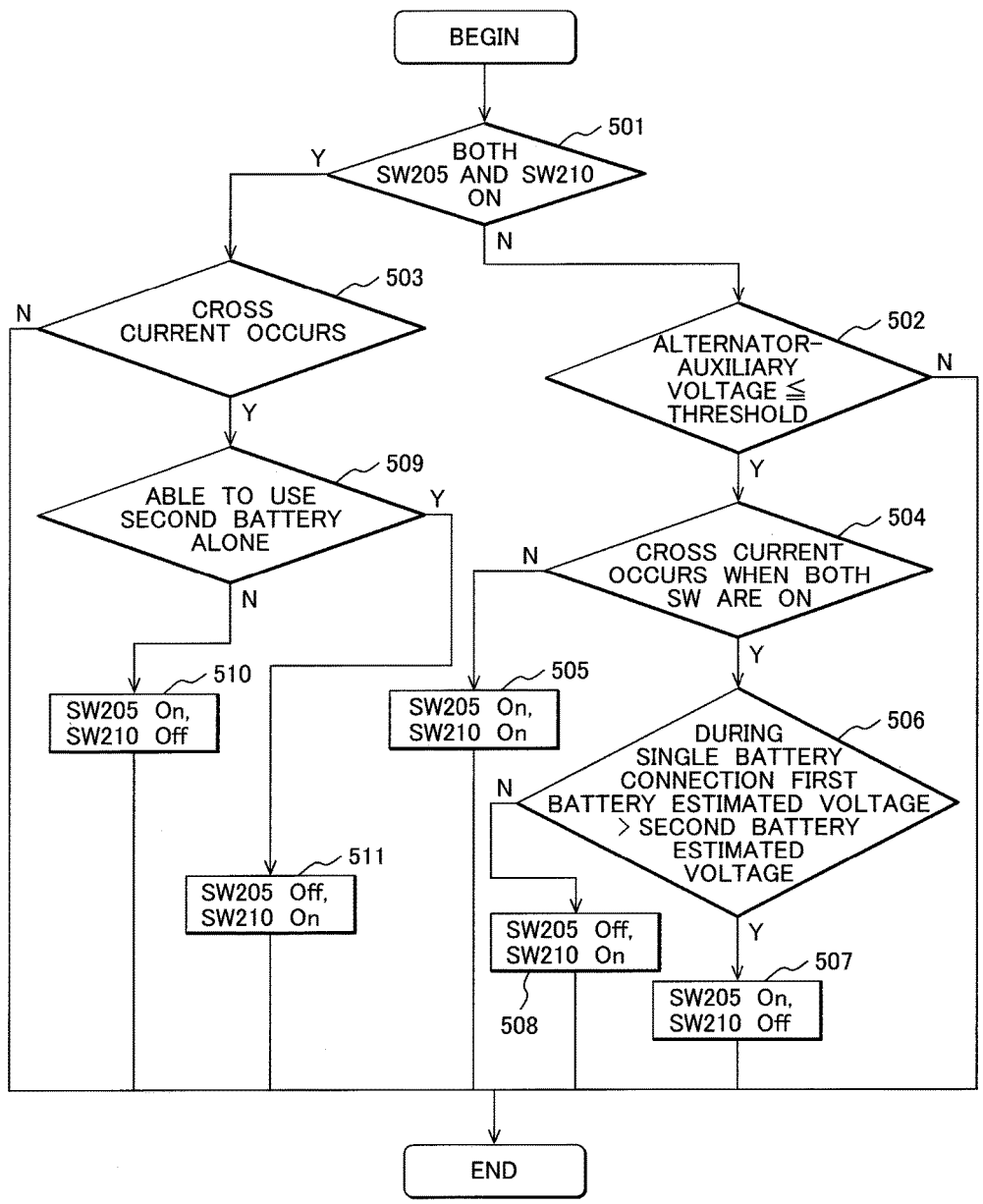
FIG. 5 is a diagram of a process during cranking.

FIG. 5 illustrates the engine cranking process 42 in FIG. 4. In FIG. 5, it is assumed that the previous ON/OFF state of the switch is used for the initial value of the ON/OFF state of the switch in FIG. 5.

First, in step 501, the battery system checks if both switches SW, the switch SW205 and the switch SW210, are turned on. If the answer is YES, the battery system moves the process to step 502, if NO (only one switch SW is turned on), the battery system moves the process to step 504.

In step 502, the battery system determines whether the voltage of the alternator and auxiliary equipment (measured by the voltage sensing line 213 in FIG. 2) is less than or equal to a predetermined threshold. When the voltage of the alternator and auxiliary equipment is less than the threshold, the battery system moves the process to step 504, and otherwise, the battery system ends the process of FIG. 5.

Here, the threshold can be set to 8 V at which an audio sound skipping occurs. For the voltage of the alternator and auxiliary equipment, the value measured by the voltage sensing line 213 in FIG. 2 used.

In step 504, assuming that both switches are turned on, the battery system obtains the estimated current of each battery and determines which a current is to be charged (cross current). When a cross current occurs, the battery system moves the process to step 506 (the process to prevent the cross current). When no cross current occurs, the battery system moves the process to step 505. Here, the estimated current used as a material to determine the occurrence of a cross current is estimated by the current estimation unit 304 of FIG. 2 for the first battery, and by the current estimation unit 209 of FIG. 2 for the second battery. The method for determining the cross current will be described below.

First, it is assumed that the OCV (Open Circuit Voltage: the battery voltage when opened) of the first battery is V1 and the OCV of the second battery is V2. Then, the DC resistance of the first battery is defined as R1, the DC resistance of the second battery is defined as R2, the resistance of the switch SW205 is defined as r1, and the DC resistance of the switch SW210 is defined as r2. The determination method of the values will be described later. Further, the current required for cranking is defined as Ia. At this time, Ia can be the value transmitted from the ECU 15, or can be given as the current currently flowing into the battery (namely, can be given the sum of the ammeters 202 and 206). Further, if a necessary power Pa is provided instead of the current, Ia is converted from Pa as Ia=2*Pa/(V+√(V*V−4*Pa*R)) by solving the quadratic equation using Power=Current×Voltage (in this case, Pa can be the value received from the ECU 15 or can be as follows: Present current×Alternator and auxiliary voltage. Further, V*V/4r≥Pa is given as the cranking ability condition). In the above, V is OCV of the battery, and R is the sum of the DC resistance and the switch SW resistance. When two batteries are connected in series, Ia is calculated as V=((r2+R2)*V1+(r1+R1)*V2)/(R1+R2+r1+r2), R=(R1+r1)*(R2+r2)/(R1+R2+r1+r2) from a circuit synthesis. Here, V1 is the OCV of the first battery, V2 the OCV of the second battery, R1 is the DC resistance of the first battery, R2 is the DC resistance of the second battery, r1 is the ON resistance of the switch SW205, and r2 is the ON resistance of the switch SW210.

Next, the method for estimating the charging current of the first battery 201 as well as the charging current of the second battery 206 will be described. The first battery 201 and the second battery 206 are switched based on the information obtained by means of taking into account the resistance of each battery. Thus, it is possible to provide a battery system that can improve the total amount of charge even the first battery and the second battery have different properties such as resistance.

Figure 6:
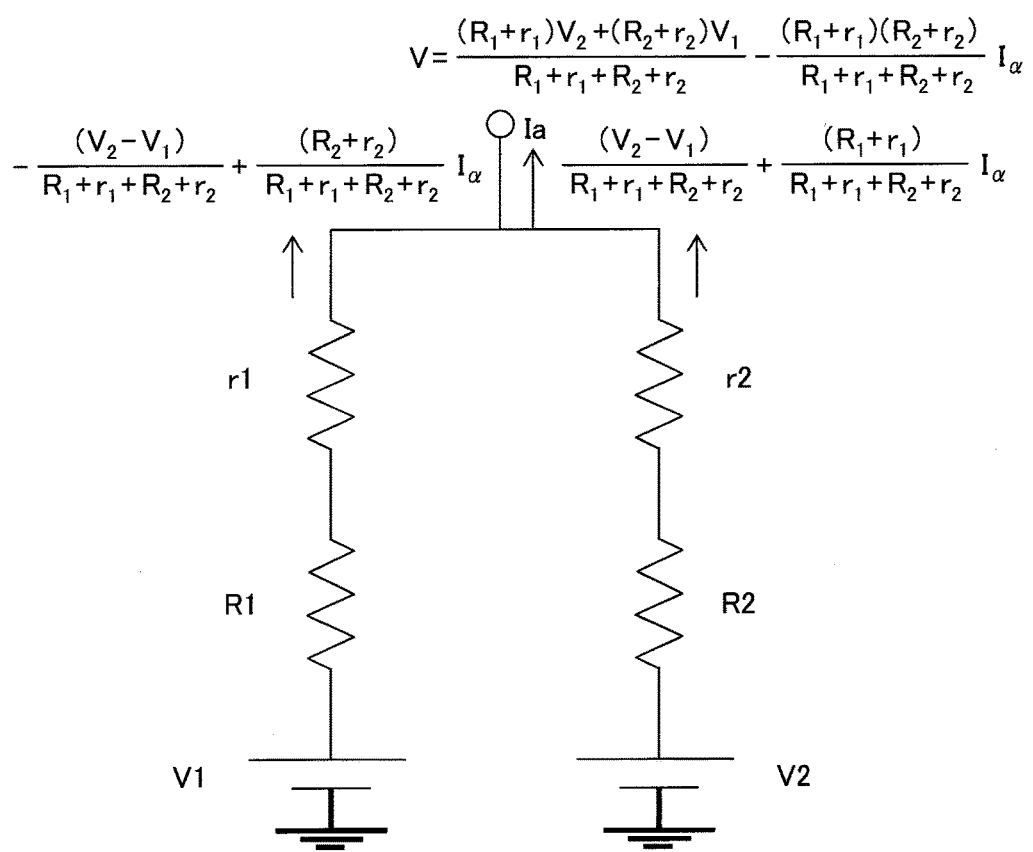
FIG. 6 is a diagram showing an equivalent circuit when the batteries are connected in parallel.

The equivalent circuit when the two batteries are connected in parallel is expressed in FIG. 6. This is because the OCV of the battery is considered to be virtually unchanged in the control cycle of FIG. 3 (for example, 10 ms). The equation of current and voltage in FIG. 3 derived from the circuit equation. Here, the current of the first battery is given by Equation 1, and the current of the second battery is given by Equation 2. In Equations 1 and 2, the discharge direction is expressed as a plus sign.

$$\text{Current of first battery} = \{-(V2-V1)+(R2+r2)Ia\}/(R1+r1+R2+r2) \quad \text{(Equation 1)}$$

$$\text{Current of second battery} = \{(V2-V1)+(R1+r1)Ia\}/(R1+r1+R2+r2) \quad \text{(Equation 2)}$$

The currents can be estimated by the current estimation unit 204 based on Equation 1 and by the current estimation unit 205 based on Equation 2. Then, the first current is positive and the second current is also positive, the battery system determines that no cross current occurs (on the other hand, if the product of the first battery current and the second battery current is smaller than 0, the battery system determines that a cross current occurs). This determination corresponds to the comparator 211 in FIG. 2. Further, as a simpler method of cross current determination, it is possible to determine that no cross current occurs if the currents satisfy Equation 3.

$$-(R1+r1) \leq (V2-V1)/Ia \leq (R2+r2) \quad \text{(Equation 3)}$$

Next, in step 505, the battery system turns on the switch SW205 (switch SW of the first battery) and turns on the switch SW210 (switch SW of the second battery) to connect both batteries in parallel, then ends the process of FIG. 5.

In step 506, assuming a single battery connection, the battery system determines whether the first battery voltage is large with respect to the estimated voltage of the battery. When the estimated voltage of the first voltage is large, the battery system moves the process to step 507, and otherwise, moves the process to step 508. Here, as for the estimated voltage in the single battery connection, the estimated voltage of the first battery is given by Equation 4, and the estimated voltage of the second battery is given by Equation 5. Similarly, the estimation methods of r1, R1, r2, R2, V1, and V2 will be described below.

$$\text{Estimated voltage of first battery} = V1 - (R1+r1)Ia \quad \text{(Equation 4)}$$

$$\text{Estimated voltage of second battery} = V2 - (R2+r2)Ia \quad \text{(Equation 5)}$$

Here, with respect to the switch SW, when only the switch SW205 of the first battery is turned on, the value read by the voltage sensing line 203 can be interpreted as the estimated voltage of the first batty, while when only the switch SW210 of the second battery is turned on, the value read by the voltage sensing line 208 can be interpreted as the estimated voltage of the second battery.

Next, in step 507, since the voltage reduction is smaller when using the first battery than when using the second battery, the battery system turns on the switch SW205 and turns off the switch SW210, and then ends the process of FIG. 5.

In step 508, since the voltage reduction is smaller when using the second battery than when using the first battery, the battery system turns off the switch SW205 and turns on the switch SW210, and then ends the process of FIG. 5.

In step 503, both switches SW are turned on, so that the battery system determines whether a cross current occurs from the values of the ammeters 202 and 206. If a cross current occurs, the battery system moves the process to step 509. If no cross current occurs, the battery system maintains the current state of the switch SW, and then ends the process of FIG. 5.

In step 509, a cross current occurs and it is necessary to switch to the single battery connection, so that the battery system determines whether or not to use the second battery. If the second battery can be used, the battery system moves the process to step 511, and otherwise, moves the process to step 510. Here, the determination of whether the second battery can be used based on the assumption that the voltage of Equation 5 is equal to a predetermined threshold (for example, the voltage 8 V at which no sound jump of an audio device occurs can be used as the threshold).

In step 510, only the first battery can be used, so that the battery system turns on the switch SW205 and turns off the switch SW210, and then ends the process of FIG. 5.

In step 511, the second battery can be used, so that the battery system turns off the switch SW205 and turns on the switch SW210 to preferentially use the second battery, and then ends the process of FIG. 5.

The next will describe the method of estimating the OCV and resistance of each battery as well as the switch SW resistance.

Here, there are two methods: a method of estimating on the device side; and a method of previously embedding characteristics data as a table. Each of the methods will be described.

First, the method of estimating on the device side will be described. When the switch SW is opened, the OCV of each battery can be set to the value read by the voltage sensing line. When the switch SW is turned on, the alternator and auxiliary voltage can be set to V-IR from the value V read by the voltage sensing line, the current I, and the resistance (denoted by R, which is the sum of the DC resistance of the battery and the ON resistance of the switch SW). The DC resistance can be set to $|\Delta V/I|$ from the difference $\Delta V$ in the measured voltage when the switch SW is previously turned OFF from ON or ON from OFF, and from the current I when the switch SW is turned ON. The ON resistance of the switch SW can be obtained, in the same manner as in the case of the DC resistance, from the difference between the measured voltage of the battery when the switch SW is previously turned OFF from ON or ON from OFF, and the alternator and auxiliary voltage. By using this method, it is possible to eliminate the need for the presetting of the batteries and to deal with estimation of currents even when the battery is exchanged.

Figures 7, 8:
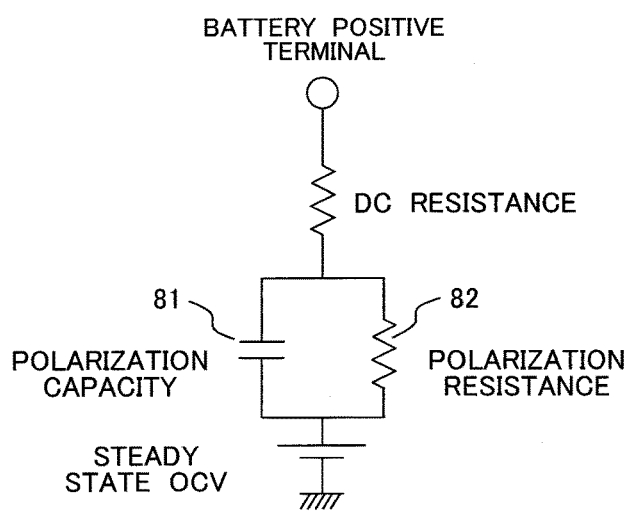
FIG. 7 is a diagram showing an example of a table of an open circuit voltage of the battery.
FIG. 8 is a diagram showing an equivalent circuit of the battery.

The next will describe the method of previously embedding characteristics data as a table. The OCV is expressed by the sum of OCV after sufficient time has elapsed (steady state OCV) and the transitional change of voltage (called polarization) that varies in an order of several minutes. The steady state OCV is generally expressed as a function of the charge rate of the battery, so that the table of FIG. 7 can be maintained to obtain the steady state OCV by interpolating the table of FIG. 7 using the value of SOC (FIG. 7 is an example of a virtual battery). Here, the charge rate is expressed as SOC (State of Charge). The SOC can be obtained by using the Kalman filter that is used in the literature by "Shuichi Ada chi and Ichiro Maruta: Fundamentals of Kalman Filter, Tokyo Denki University Press, Mar. 10, 2013, first edition second printing". It is also possible that the SOC is obtained as an initial value from the table of FIG. 7 in reverse order using the voltage of the battery at the moment when the ignition is turned on, which is then updated from time to time as 100×Current integral value/Battery capacity (current integral method). Further, under the assumption that Measured voltage DC resistance× Current resistance−Polarization voltage as the steady state OCV, it is possible to obtain SOC from the table of FIG. 7 in reverse order (in which the current is positive for discharging. This will be referred to as voltage estimation method). In addition, it is also possible to take a weighted average between the current integral method and the voltage estimation method.

Next, the method for estimating the polarization voltage will be described. Because the charge and discharge in the micro HEV is less than about one minute, the description assumes that the equivalent circuit of the battery is as shown in FIG. 8. Here, what corresponds to the polarization is the voltage of a polarization capacity 81 and polarization resistance 82. Here, if the values of the polarization capacity c and the resistance r are known, the polarization voltage can be calculated from Equation 6.

$$\text{Polarization voltage}=I(t)*\exp(-t/cr)/cr \quad \text{(Equation 6)}$$

I(t): Measured battery current (the charge direction is assumed to be positive)

*: Convolution integral

Further, Equation 7 can be used by simplifying Equation 6. Here, when Equation 7 is used, vp(0)=0 can be assumed.

$$vp(t)=vp(t-\Delta t)*(1-\Delta t/cr)+I(t)\times\Delta t/c \quad \text{(Equation 7)}$$

$\Delta t$: Time step size of current measurement

Vp: Polarization voltage

The estimation method described above requires the values of c and r, so that the values can be prepared as a table shown in FIG. 9. More specifically, the values of c and r are obtained by interpolating the table of FIG. 9 from the value of SOC obtained as described above. Note that c and r may vary depending on the temperature. In this case, it is possible to attach a thermometer to each battery and prepare the table of FIG. 9 for each temperature, in order to obtain the values by an interpolation from the measured temperature.

Next, the values of the DC resistance and the switch. SW resistance will be described. First, an example of the table of DC resistance is shown in FIG. 10. Similarly, it is possible to obtain the values by an interpolation in the table of FIG. 10 using the SOC described above. In addition, the value of the DC resistance may vary depending on the temperature. In this case, it is possible to attach a thermometer to each battery and prepare the table of FIG. 10 for each temperature, in order to obtain the value by an interpolation from the measured temperature. With respect to the switch SW resistance, one value can be stored in the controller 200, or a table example of FIG. 11 can be maintained to interpolate the value by the thermometer of the controller. Here, for the DC resistance and the switch SW resistance, the values estimated from the measured values can be used.

Figure 12:
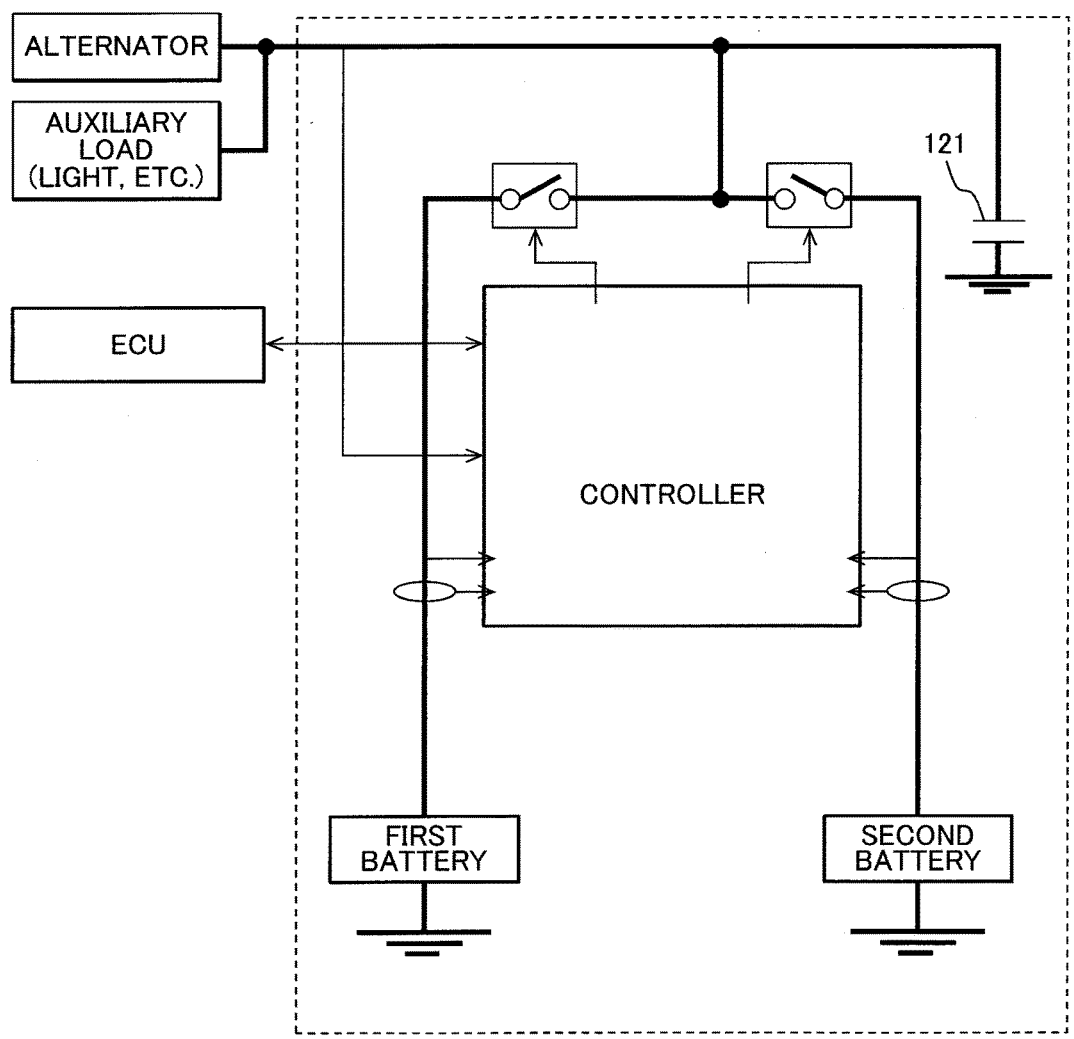
FIG. 12 is a diagram of a power supply system in which a capacitor for preventing a momentary power interruption is added.

In the process described above, at the time of switching the switch SW, the battery may not be instantaneously connected upon switching of the switch SW, depending on the timing of switching the switch SW. To deal with such a problem, the configuration of FIG. 12 can be used in which a capacitor 121 is added to the battery system of FIG. 2. Further, it is possible to add a circuit to the switch control unit 212 in order to prevent both batteries from being turned off when only one battery is turned on. An example of the gate circuit is shown in FIG. 13.

Figure 13:
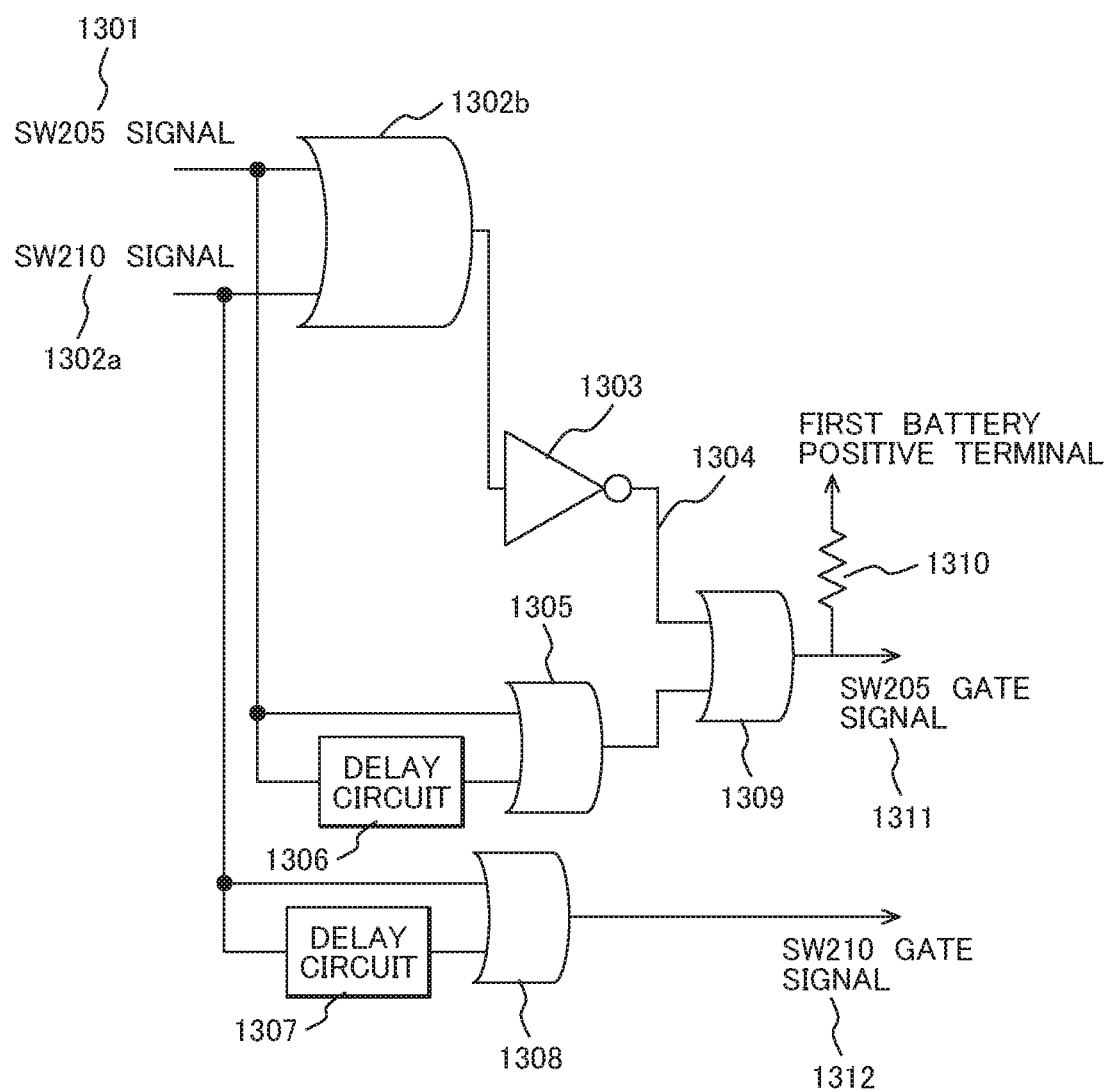
FIG. 13 is a diagram showing a gate process of the switch SW.

In FIG. 13, a switch SW205 gate signal 1311 and a switch. SW210 gate signal 1312 are generated with a switch. SW205 signal 1301 and a switch SW210 signal 1302a as input. Here, the switch SW205 signal and the switch SW210 signal are the SW signals in FIGS. 3, 4, and 5 (or they can also be TTL: Transistor and Transistor Logic signals). Then, the state of logic 1 is defined as ON and the state of logic 0 is defined as OFF. Further, the switch SW205 gate signal is the signal line of the switch SW205 in FIG. 2, and the switch SW210 gate signal is the signal line of the switch SW210 in FIG. 2, Here, FIG. 13 corresponds to the SW control unit 212 in FIG. 2. First, the condition of both-off state is determined using OR gate 1302b and NOT gate, in order to prevent the both-off state from occurring. The signal at which the both-off sate occurs is a signal 1304. In the case of the both-off state, it is designed to forcibly connect the signal to the first battery so as to serve as a safe site. For this reason, the switch SW205 gate signal is defined as OR of the candidate of the switch SW205 signal and the both-off signal, by using the OR gate 1309. Note that the controller 200 is put into a sleep state during parking, so that the power supply of each gate is turned off. In this case, the battery system forcibly sets the signal to 1 by using pull-up resistance 1310 to keep the switch SW205 turned on, in order to use the first battery as the power supply of the protective device. Note that when a mechanical relay is used for the switch SW205, it is enough to connect the terminal of the switch SW so that the relay is ON at a position where the gate current (the electromagnet of the relay) is 0. Thus, the pull-up resistance is not required. Further, when a relay based on the latch-up mechanism (the type that maintains the previous state of the switch SW even if the electromagnetic current does not flow) is used in the mechanical relay, this case is also an exception to the rule (that is, the pull-up resistance is not required and there is no need to consider the switch SW terminal to be provided taking into account the state of current 0 time). If EFT or IGBT is used for the switch SW205, an FET (or IGBT) driver may further be added. In this case, the power supply of the FET driver should not be turned off even during packing. If the current consumption of the FET driver is large, it is possible to configure such that the mechanical relay is connected in parallel only with the switch SW205 so that the switch SW205 is turned on when the current of the electromagnetic is 0, allowing the FET to perform the switch SW operation during the ignition ON, resulting in a longer lifetime of the mechanical relay. On the other hand, when the pull-up resistance is not used, a diode can be connected in parallel with the switch SW205 (in which the current direction of the diode is from the first battery to the alternator and auxiliary equipment side). Further, when FBI is used for the switch SW210 that is preferably OFF during parking, a pull-down resistance may be added to the gate of the switch SW210.

Next, a delay will be described. Here, when each of the signal switch SW205 and the switch SW210 is changed from ON to OFF, both switches SW could be turned off due to a delay until the switch SN is turned on or due to a delay of the gate. Thus, circuits (1306, 1307) are provided to delay the switch SW signal by taking OR of the delayed signal and the original signal (OR gates 1305, 1308), in order to prevent both switches SW from being turned OFF. Note that with respect to the switch SW205 signal, in order to prevent a possible case of turning both OFF that would occur due to interruption on the program side, the switch SW205 gate signal 1311 is defined using this signal as the candidate of the switch SW205, by taking OR of the both-off state signal as described above. For the switch SW210 gate signal, the signal of the OR gate 1308 is used. As the delay circuit, it is possible to configure such that an integer circuit is connected to the gate signal and the output of the integer circuit is received by a Schmitt trigger circuit. Here, as the delay time, it is possible to determine the time constant of the integer circuit as the value previously determined as follows: ON delay time of switch SW+Delay time of gate.

Note that FIG. 13 is the circuit, which can also serve as the logic of the program corresponding to FIG. 13 (in which when pull-up resistance is added, the pull-up resistance is attached to the I/O signal of the CPU that is used as the switch SW205 gate signal).

Note that the destination to which the pull-up resistance and the pull-down resistance are connected may vary either GND or the positive voltage of the first battery, depending on whether the FET is P channel or N channel. However, it is possible to connect the pull-up resistance and the pull-down resistance in such a way that the switch SW205 is turned ON and the switch SW210 is turned OFF during parking.

Figure 14:
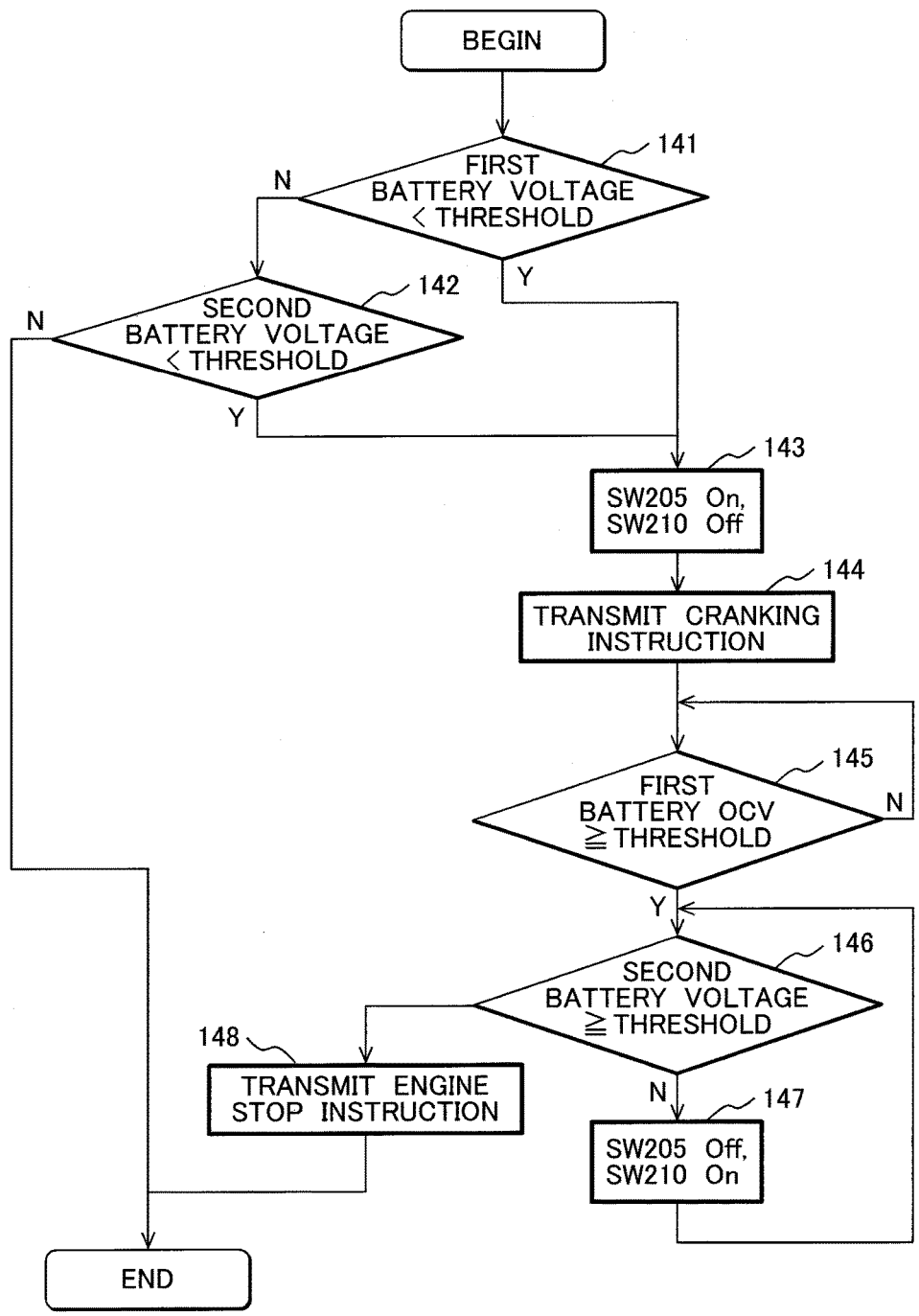
FIG. 14 is a diagram of a process that deals with reduction in the battery voltage after a long parking.

The next will describe measures for the case in which the voltage is reduced due to self-discharge of the first battery or the second battery during a long parking period The process in this case will be described as an example including the process when the ignition is turned on as well as the process during controller wake-up. An example of the process this case will be described as FIG. 14. FIG. 14 is the process after the controller 200 wakes up.

In step 141 after wake up, the battery system determines whether the first battery voltage (equal to OCV) is less than a certain threshold. If the first battery voltage is less than the threshold, the battery system moves the process to step 143. If the first battery voltage is not less than the threshold, the battery system moves the process to step 142. Here, as the threshold, it is possible to set a value corresponding to the voltage of the value of SOC 80% or 90% in. advance. In this case, it is necessary to maintain the charge rate of the first battery as well as the table of OCV (FIG. 7).

In step 143, the charge rate of the first battery is insufficient, so that the battery system turns on the switch 205 and off the switch 210, and moves the process to step 144. In step 144, the battery system issues a cranking instruction to start charging the first battery, and moves the process to step 145. Here, the battery system can wait until the driver cranks the engine, instead of transmitting the cranking instruction.

In step 145, the battery system repeats the process until the charge rate is equal to or more than the charge rate of the first battery. When the charge rate is equal to or more than the threshold, the battery system moves the process to step 146. Here, the procedure for obtaining the charge rate will be described. The battery system first starts charging and approximates under the assumption that the current time series i(t) after the current is switched to CV charging is the exponential function (obtain the coefficients x, y, in Equation 8). Note that R1 can be calculated using the current and voltage before and after the start of charging, as follows: R1=(voltage immediately after charging voltage before charging)/(current immediately after charging current before charging). It is also possible to use the value previously stored in the table as described above.

$V(t)$=Measured first battery voltage value−Measured first battery current value×R1−Initial OCV (Equation 8)

$Q(t) = \int_{\tau}^{\tau+(n-1)\Delta T} i(t) dt$ $f(t) = \int_{\tau}^{\tau+(n-1)\Delta T} V(t) dt$ $g(t) = \int_{\tau}^{\tau+(n-1)\Delta T} Q(t) dt$ $V(t) \approx x^*f(t) + y^*g(t) + z^*Q(t)$ x=Polarization resistance × Polarization capacity
Polarization resistance×(1+polarization capacity/capacity of the first battery)
z=1/Capacity of first battery [F]

Here, the time series of Q(t), f(t), and g(t) can be obtained from the measured values, so that x, y, z can be obtained as Equation 9 by the least squares, as long as if there an accumulation of data of the time τ when CV charge is started, Time τ+ΔT, . . . , Time τ+(n−1) ΔT.

$$\begin{pmatrix} x \\ y \\ z \end{pmatrix} = \begin{pmatrix} \int_{\tau}^{\tau+(n-1)\Delta T} f(t)f(t)dt & \int_{\tau}^{\tau+(n-1)\Delta T} f(t)g(t)dt & \int_{\tau}^{\tau+(n-1)\Delta T} f(t)Q(t)dt \\ \int_{\tau}^{\tau+(n-1)\Delta T} f(t)g(t)dt & \int_{\tau}^{\tau+(n-1)\Delta T} g(t)g(t)dt & \int_{\tau}^{\tau+(n-1)\Delta T} g(t)Q(t)dt \\ \int_{\tau}^{\tau+(n-1)\Delta T} f(t)Q(t)dt & \int_{\tau}^{\tau+(n-1)\Delta T} g(t)Q(t)dt & \int_{\tau}^{\tau+(n-1)\Delta T} Q(t)Q(t)dt \end{pmatrix}$$ (Equation 9)

$$\begin{pmatrix} \int_{\tau}^{\tau+(n-1)\Delta T} f(t)V(t)dt \\ \int_{\tau}^{\tau+(n-1)\Delta T} g(t)V(t)dt \\ \int_{\tau}^{\tau+(n-1)\Delta T} Q(t)V(t)dt \end{pmatrix}$$

Whether or not the charge rate is the prescribed value can be determined under the assumption that, when Equation 10 is true, step 146 is true by using z obtained from. Equation 9. Equation 9 requires storing the previous time series, so that it may be difficult to calculate with the specifications of the CPU of the controller 200. In such a case, the recursive least squares can be used to update the time series one by one (Aira, Akizuki, Nakamizo, Kataya: System Identification, The Society of instrument and Control Engineers, 1981). For the target charge rate, it is possible to use the value of the charge rate (for example, 80%, 90%) that is used in step 141.

OCV of target charge rate−Initial OCV≥Q(t)*z (Equation 10)

Next, in step 146, the battery system determines whether or not the voltage of the second battery is equal to or more than the threshold. If the voltage of the second battery is less than the threshold, the battery system moves the process to step 147. The battery system turns off the switch SW205 and turns on the switch SW210, and repeats the process until the voltage of the second battery reaches the threshold. When the voltage of the second battery is equal to or more than the threshold, the battery system moves the process to step 148, and transmits an instruction to the ECU 15 to allow stopping the engine. When idling is stopped, the alternator can be stopped on the ECU side. Then, the battery system ends the flow of FIG. 14. Here, the threshold is the minimum voltage of the second battery.

In step 142, the battery system determines whether or not the voltage of the second battery is less than the threshold. If the voltage of the second battery is less than the threshold, it is necessary to charge the second battery, so that the battery system moves the process to step 143. If the voltage of the second battery is equal to or more than the threshold, the battery system ends the process of FIG. 14. Here, for the threshold, the same value of the threshold described in step 146 is used.

As described above, since the charging current of the battery system can be estimated during the generative charging time, the battery system transmits the estimated charging current to the ECU 15. On the ECU side, a torque change occurs (in proportion to the current) by the alternator. Thus, a mechanical brake emphasis control can be performed in order to prevent the torque from being discontinued during braking and to improve the ride quality. Further, it is possible to transmit the charging power to the ECU 15, instead of the charging current. The charging power is calculated as follows: Estimated charging current×Alternator and auxiliary voltage.

The next will describe a first embodiment that switches the switch once during the time from the start of regeneration to its completion (36 in FIG. 3). By prohibiting the parallel battery connection and by switching between the switch SW only once, the cross current can be reduced as much as possible and noise due to switching between the switch SW can be reduced.

The switching timing is as follows. For example, the battery system estimates the current time series when only one battery is connected, compares the times series I(T−τ) and i(τ), in which the current time series of the first battery is I(t) and the current time series of the second battery is i(t). Then, the battery system obtains the solution τ of the non-linear equation so that the current time series I(T−τ) and the current time series i(τ) are equal. When τ has elapsed from the regeneration, the battery system switches from the second battery to the first battery (T is the regeneration time).

Figure 15:
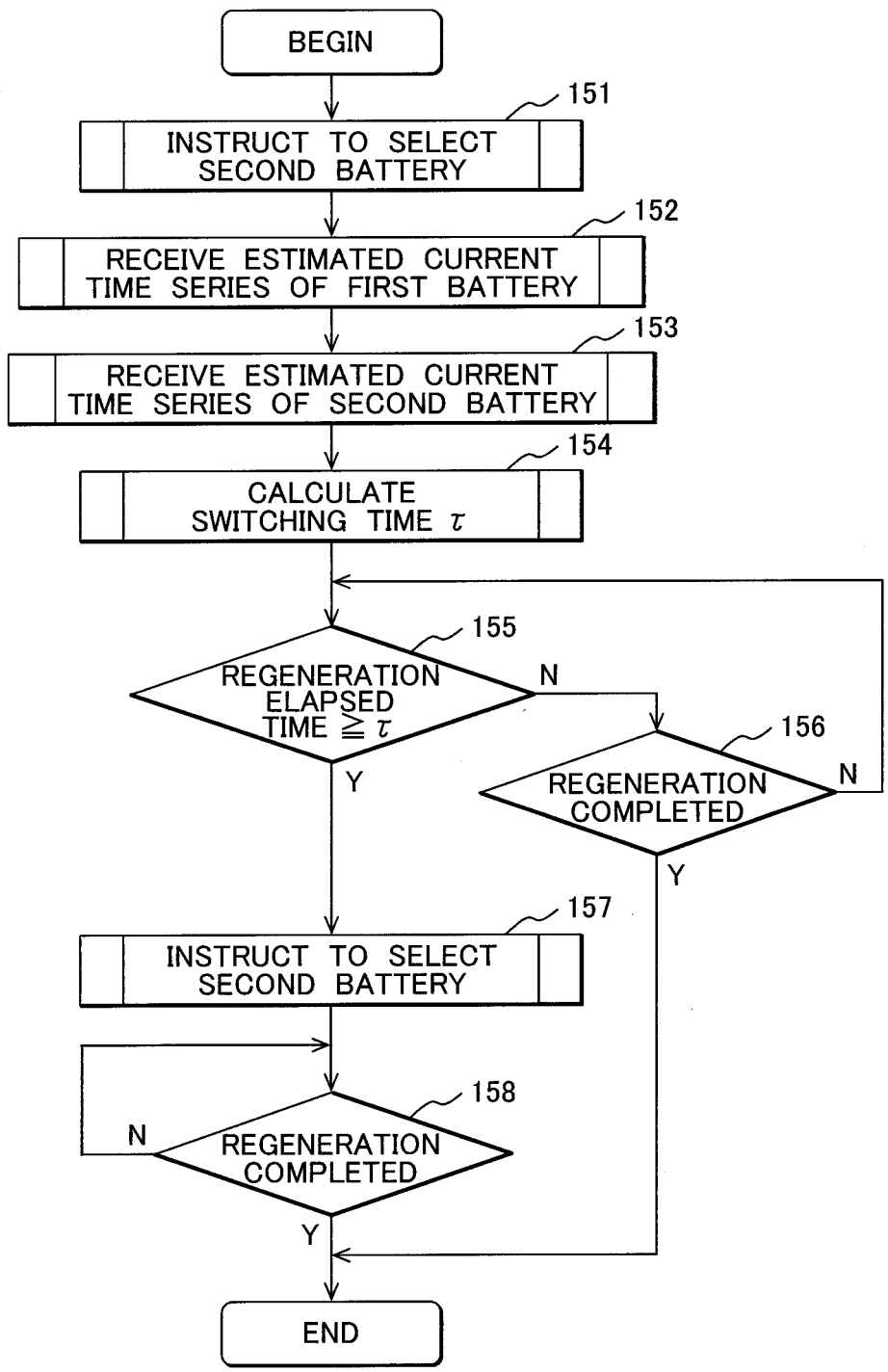
FIG. 15 is a diagram of an example of a switch control during a regenerative charging.

FIG. 15 shows an example of the process of regenerative charging first selecting the second battery (it is also possible to first charge the first battery first, and an example of this will be described below). More specifically, the battery system turns off the switch SW205 and turns on the switch SW210.

Next, in step 152, the battery system receives the estimated current time series i1(t) when only the first battery is selected. The estimated current time series is calculated by the current estimation unit 204.

Next, in step 153, the battery system receives the estimated current time series i2(t) when only the second battery is selected. The estimated current time series is calculated by the current estimation unit 209.

Here, a description will be given of the method for calculating the estimated current time series in steps 152 and 153, as well as an example of reception format. Here, as the format example, there are two cases: one is to transmit the constant in an equation under the previous assumption of the equation; and the other is to transmit the current time series. Each of the format examples will be described.

Figure 16:
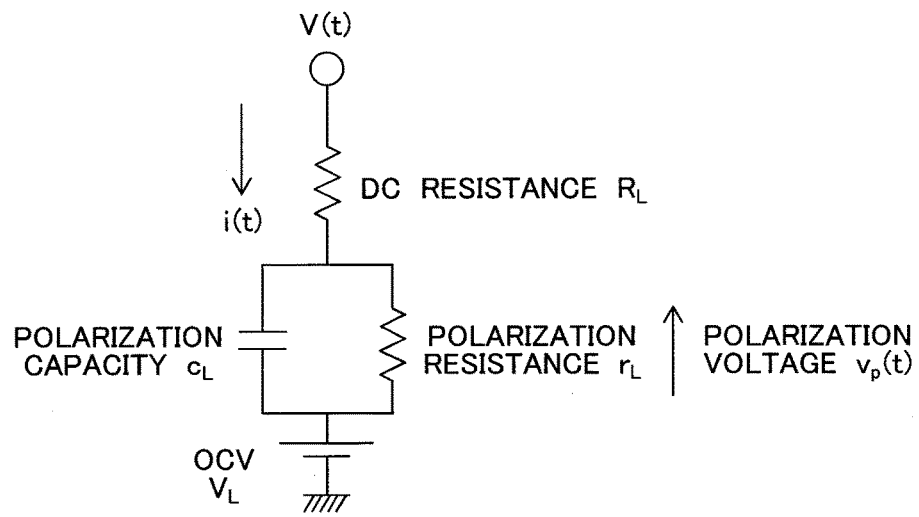
FIG. 16 is a diagram of an equivalent circuit of a large capacity battery.

The first will describe each of three types of batteries: a battery with large capacity, such as a lead acid battery in which the OCV is nearly unchanged in one regeneration (a large capacity battery); a battery with small capacity in which the OCV is significantly changed in one regeneration (a small capacity battery); and a battery such as a capacitor in which the polarization can be ignored (which is not exactly battery but is referred to as a battery in this specification). An equivalent circuit of the large capacity battery is assumed as shown in FIG. 16. In this case, the current time series i(t) of Equation 11 is obtained by solving the circuit equation of FIG. 16.

$$i(T) = \begin{cases} I_a & t < \kappa, \\ I_\infty + (I_a - I_\infty)e^{-(t-\kappa)/\tau_L} & \text{otherwize.} \end{cases} \quad \text{(Equation 11)}$$

Figure 17:
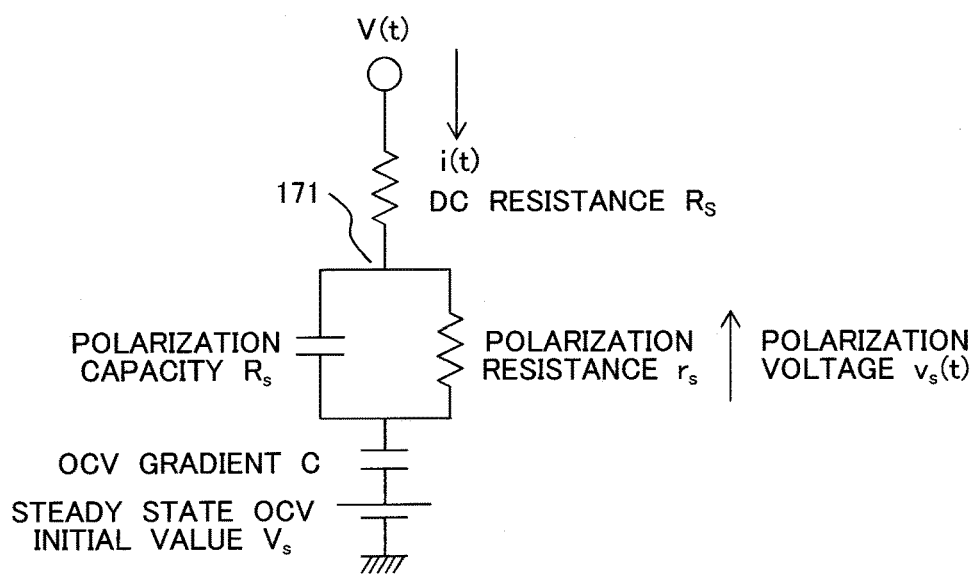
FIG. 17 is a diagram of an equivalent circuit of a small capacity battery.

Ia: Maximum current that alternator can generate−Auxiliary equipment current
$I\infty=(V_a-V_L)/(R_l+r_L)$: Steady current
VL: OCV of large capacity battery
Va: CV voltage of alternator
RL: DC resistance+Switch SW resistance
rL: Polarization resistance
τL: lime constant=$PL*rL*cL/(RL+rL)$
cL: Polarization capacity
κ: CC charge completion time=$cL*rL*Ln\{(Ia*rL-vp(0))/(VL+(RL+rL)Ia-Va)\}$
Vp(0): Polarization voltage initial value The equivalent circuit of the small capacity battery is approximated to FIG. 17. This is the case is which the function of OCV (SOC) is approximated to a linear function. In this case, the current time series of Equation 12 is obtained by solving the circuit equation of FIG. 17.

$$i(t) = \quad \text{(Equation 12)}$$
$$\begin{cases} I_a & t < \kappa, \\ I_a CR_s\{f(t-\kappa) + c_s r_s f'(t-\kappa)\} + v_s Cf(t-\kappa) & \text{otherwize.} \end{cases}$$

$$f(t) = \frac{1}{\lambda_1 - \lambda_2}(e^{-t\lambda_1} - e^{-t\lambda_2})$$

Ia: Maximum current that alternator can generate−Auxiliary equipment current
C: Capacity that represents gradient of OCV(SOC) curve [F]
Rs: DC resistance+Switch SW resistance
cs: Polarization capacity
rs: Polarization resistance
vs: Polarization voltage at completion of CC charging=$V_a-V_s-I_a*R_s-I_a*\kappa/C$ λ1, λ2: Solution of quadratic equation (λ1>λ2)

$\lambda1+\lambda2=C(Rs+rs)+cs*rs, \lambda1*\lambda2=C*Rs*cs*rs$ $$\kappa : CC \text{ charge completion time} = c_s r_s W\left(C\frac{I_a r_s - v_s(0)}{I_a c_z r_s}\exp\left(\frac{\eta}{c_s r_s}\right)\right) - \beta$$

$$\beta = \frac{C}{I_a}(V_s + I_a(R_s + r_s)) - V_a$$

Figure 18:
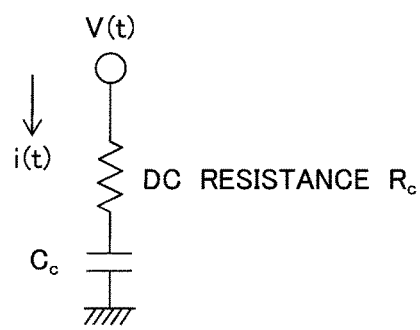
FIG. 18 is a diagram of an equivalent circuit of a capacitor.

W(x): Lambert W function
Va: CV voltage of alternator
vs (0): initial polarisation voltage
Vs: Initial steady state OCV The equivalent circuit of the capacitor is configured as shown in FIG. 18. In this case, the time series of Equation 13 is obtained by solving the circuit equation of FIG. 18.

$$i(t) = \begin{cases} I_a & t < \kappa \\ I_a e^{-(t-\kappa)/C_c R_c} & \text{otherwize.} \end{cases} \quad \text{(Equation 13)}$$

Ia: Maximum current that alternator can generate Auxiliary equipment current
Rc: DC resistance+Switch SW resistance
Cc: Capacitance of capacitor $$\kappa : CC \text{ charge completion time} = \frac{C_c}{I_a}(V_a - V_c(0)) - C_c R_c$$

Vc(0): Initial OCV of the capacitor

Thus, the battery system determines the equation to which the function belongs, in advance, among Equations 11, 12, and 13 from each type of the batteries, the first battery and the second battery. Then, the battery system calculates the coefficient and transmits the coefficient. Here, instead of the coefficient, the battery system can transmit the current time series during the CC charging time, Ia, CV charging period. For the time series, a time series per 1 s or 0.5 s can be used. Note that the CC charging time κ of the small capacity battery is the Lambert W function, and there is proposed a fast and accurate numerical calculation method for the Lambert W function (Reference Literature, Chapeau-Blondeau, F. and Monir, A: Evaluation of the Lambert W Function and Application to Generation of Generalized Gaussian Noise With Exponent 1/2, IEEE Trans. Signal Processing, 50(9), 2002). Thus, the CC charging time κ of the small capacity battery can be calculated by the CPU of the controller 200. Further, the value can also be obtained by the interpolation using the table of W function set in advance. The next will describe how to obtain the coefficients in Equations 11, 12, and 13, respectively. The DC resistance and the switch. SW resistance can be obtained by the ratio of the previous current change and voltage change as described above, or by using the value set in the table in advance. When the switch SW connected to each battery is OFF, the initial OCV can be set as follows: Measured voltage value−Polarization voltage. Here, the polarization voltage is problem. When the polarization capacity and the polarization resistance are known, the polarization voltage can be obtained by calculating Equation 6 or Equation 7 using the measured current. The polarization capacity and the polarization resistance can be obtained by the interpolation using the table maintained as described above (however, it is necessary to separately prepare a table during the charging), or they can be obtained from the previous time series data. As for this method, the polarization capacity and the polarization resistance can be obtained as Equation 9 using the measured data in the precious CV charging (however, V and I are obtained from the measured value in the charge and then Q, f, g are obtained). It is possible to obtain the polarization capacity and resistance by solving the simultaneous equations represented by Equation 9 under the assumption that x=−Polarization capacity×Polarization resistance, y=Polarization resistance×(1+polarization capacity/capacity C), z=1/Capacity C. Note that when the initial ignition is ON and the process of FIG. 14 is not added, the polarization capacity and resistance are unknown, so that it is possible to use the value immediately before the completion of the last run. With respect to the setting value at the factory shipment, it is possible that CV charging of the battery is performed to set the initial value from the measured data. Note that Ia can be received from the ECU 15.

Next, in step 154, the battery system determines the switching time $\tau$ so that the stored charge is the maximum. This idea will be described. Under the assumption that the current time series of the first battery is $i1(t)$, the current time series of the second battery is $i2(t)$, and the regeneration time is T, the stored charge Q is expressed as Equation 14.

$$Q(\tau) = \int_0^\tau i_2(t)dt + \int_\tau^T i_1(t)dt \qquad \text{Equation 14}$$

The one that gives the maximum of Equation 14 is $\tau$ defined by $dQ(\tau)/d\tau=0$, so that the solution $\tau$ of Equation 15 is the switching time at which the charge is the maximum, $$i2(\tau) = i1(T-\tau) \qquad \text{Equation 15}$$

Figure 19:
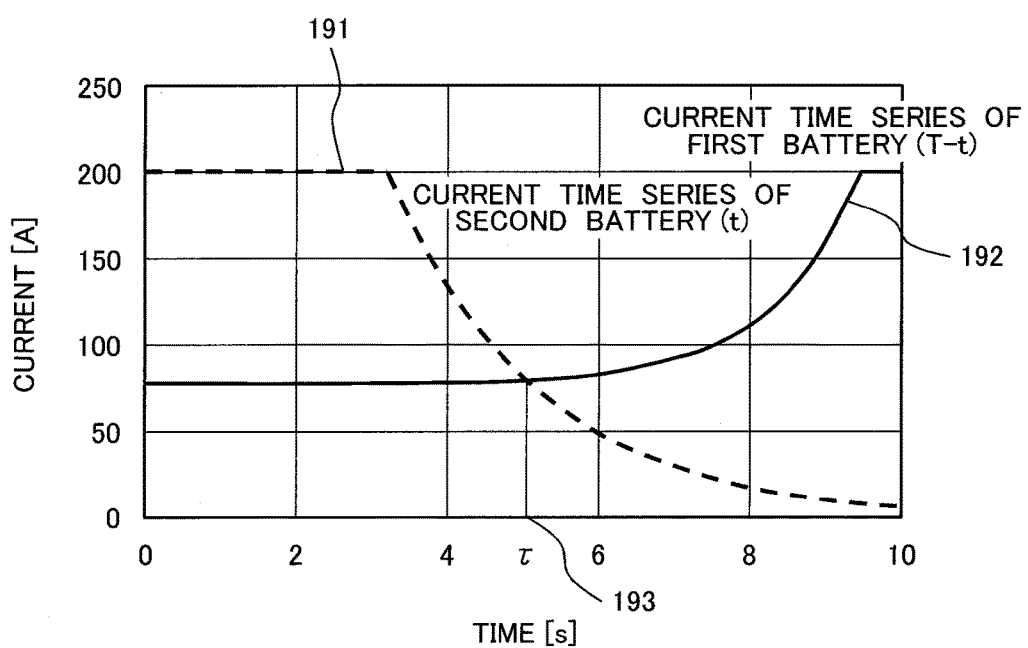
FIG. 19 is a diagram showing a geometric image for a calculation of a battery switching time.

Equation 15 is a non-linear equation. The image of the solution is shown in FIG. 19. Here, the curve 191 represents i2 (equivalent to $i2(\tau)$), and the curve 192 represents i1 plotted against the time axes in the reverse direction (equivalent to $i1(T-\tau)$). The intersection 193 is the solution $\tau$ of Equation 15. Thus, the current in the switching time $\tau$ of the second battery is equal to the current of the first battery at the completion of the regeneration.

In other words, the battery system switches between the switch SW at the timing when the amount of charge of the first and second batteries is the maximum (the first battery and the second battery can be opposite to one another), under the assumption that the regeneration time is T, the charging time of the second battery is $\tau$ (T>$\tau$), and the first charging time is T−$\tau$. $\tau$ is the timing at which the total of the value is the maximum during the regeneration time T, the total of the value being obtained by integrating the equation plotting the charging time and the current value of the second battery in the range from the charging time 0 to $\tau$, and the value obtained by integrating the equation plotting the charging time and current value of the first battery in the range from T to $\tau$ in the reverse direction.

In other words, the battery system switches between the switch SW at the timing $\tau$ at which the amount of charge of the first battery and the second battery is the maximum (the first battery and the second battery can be opposite to one another), under the assumption that the regeneration time is T, the charging time of the second battery is $\tau$ (T>$\tau$), and the first charging time is T−$\tau$. The timing $\tau$ is the timing at which the total of the value is the maximum during the regeneration time T, the total of the value being obtained by integrating the equation plotting the charging time and current value of the second battery in the range from the charging time 0 to $\tau$, and the value obtained by integrating the equation plotting the charging time and current value of the first battery in the range from T to $\tau$ in the reverse direction.

The nonlinear equation in Equation 15 can be solved using Newton's method or bisecton method (Reference Literature, Miida, Suda: Numerical Calculation. Method Second Edition, Morikita Publishing Co., Ltd., 2014). Note that the value of the current function can be calculated during the numerical calculation by using the equation described above. When the time series data is given, the value of the function can be calculated by the interpolation.

Here, practically i1 may deviate from the estimated current time series when the absolute value of the polarization voltage is reduced due to $\tau$. As the correction of this effect, it is possible to use the function of Equation 16 as the correction of $\kappa$ of Equation 11 and to use the function of Equation 17 as the correction of Equation 12.

$$\kappa = c_L r_L \ln\left(\frac{I_0 r_L - v_L(0)^* \exp(-\tau/c_L r_L)}{V_L + I_0(R_L + r_L) - V_a}\right) \qquad \text{(Equation 16)}$$

$$\kappa = c_s r_s W\left(C\frac{I_a r_s - v_h(0)\exp(-\tau/c_s r_s)}{I_a c_s r_s}\exp\left(\frac{\eta}{c_s r_s}\right)\right) - n \qquad \text{(Equation 17)}$$

Note that Equation 15 assumes that the regeneration completion time T is known. However, T is often unknown unless the information can be obtained from the ECU (in this case, for example, T can be obtained on the side of the ECU 15 from the speed and deceleration). When T is unknown, it is possible to calculate i1 as I∞ because a large capacity battery is used for the first battery, or it is possible to prepare a typical time for regeneration in advance (for example, 5 s or 10 s).

After obtaining $\tau$ in step 154, the battery system moves the process to step 155 to determine whether the elapsed time from the regeneration start is equal to or more than $\tau$. If the elapsed time is equal to or more than $\tau$, the battery system moves the process to step 157, and otherwise, moves the process to step 156. In step 156, the battery system determines whether the regeneration is completed. If the regeneration is not completed, the battery system returns the process to step 155. Whether or riot the regeneration is completed is determined by the signal from the ECU 15, or under the assumption that the sum of the ammeters is 0 or more. When the regeneration is completed, the battery system ends the process of the FIG. 15.

In step 157, the battery system transmits an instruction to the switch SW to select the second battery. More specifically, the battery system turns on the switch SW205 and turns off the switch SW210. After switching the switch SW, the battery system moves the process to step 158. In step 158, the battery system ends the process of FIG. 15 when the regeneration is completed.

In the process described above, the second battery is first turned on, but it is also possible to first turn on the first battery.

Second Embodiment

The flow of the second embodiment in the micro HEV of the present invention will be described in detail with reference to FIG. 20. The second embodiment is designed to perform switching two or more times from the start of regeneration to its completion. The battery system obtains the estimated current of the first battery as well as the estimated current of the second battery at regular intervals. Then, each time the battery system switches the switch SW to the battery with the larger of two estimated currents between the first and second batteries and performs charging.

More specifically, when the first and second batteries are both available for CC charging, the battery system switches periodically between the first and second batteries. When the CC charging of one battery is completed, the battery system charges the other battery. Then, the battery system continues charging by switching to the battery with the larger of the two estimated currents between the first and second batteries. Details will be described below.

This example shows the process that prohibits the batteries from being connected in parallel simultaneously while allowing for switching of the switch SW two or more times in one regeneration (the remaining processes are the same as in the first embodiment), in order to prevent the cross current as much as possible during regenerative charging (because there is a possibility that a cross current may occur only at the moment of switching of the switch SW). In other words, the battery system performs FIG. 20 instead of FIG. 15 in the first embodiment.

First, in step 2001, the battery system receives the estimated current i1 immediately after connecting only the first battery. This calculation is calculated by the current estimation unit 204 in FIG. 2. The calculation method is as follow: (CV voltage of alternator measured voltage of first battery)/ (DC resistance of first battery+ON resistance of switch SW205 when the switch SW205 is currently OFF. For the DC resistance and the ON resistance of the switch SW, the method described in the first embodiment is used. When the switch SW205 is currently ON, the measured current value is used. Then, the battery system moves the process to step 2002.

In step 2002, the battery system receives the estimated current i2 immediate/after connecting only the second battery. This calculation is calculated by the current estimation unit 209 in FIG. 2 (hereinafter, the charging direction of the current is assumed to be positive). The calculation method is as follows: (CV voltage of alternator—measured voltage of second battery)/(DC resistance of second battery+ON resistance of switch SW210) when the switch SW210 is currently OFF. With respect to the DC resistance and the ON resistance of the switch SW, the method described in the first embodiment is used. When the switch 210 is currently ON, the measured current value is used. Then, the battery system moves the process to step 2003.

In step 2003, the battery system determines whether both batteries are switched to CC charging (constant current charging). If both batteries are in the CC charging state, the battery system moves the process to step 2008, and otherwise, moves the process to step 2004. As for the determination method, the method uses Ia (alternator generation current auxiliary equipment current), in which i1≥Ia and i2≥Ia.

In step 2004, the battery system compares i1 and i2. If i1 is greater than i2, the battery system moves the process to step 2005, and otherwise, moves the process to step 2006. In step 2005, the battery system transmits a switch SW instruction to select the first battery. More specifically, the battery system turns on the switch SW205 and turns off the SW210. Then, the battery system moves the process to step 2007. In step 2006, the battery system transmits a switch SW instruction to select the second battery. More specifically, the battery system turns off the switch SW205 and turns on the switch SW210. Then, the battery system moves the process to step 2007. This is in order to increase the stored charge by selecting the battery with the larger of the two charging currents.

In step 2008, CC charging takes place when either battery is connected, so that the battery system performs "SW selection process in CC charging", which is the process to increase the CC charging time. This process will be described below. After the completion of step 2008, the battery system moves the process to step 2007.

In step 2007, the battery system determines whether the regeneration is completed. If the regeneration is not completed, the battery system moves the process to step 2001. If the regeneration is completed, the battery system ends the process of FIG. 20. Note that these processes can be returned to step 2001 per measurement cycle (for example, per 10 ms) or per 0.1 s.

As for he switch SW selection process in the CC charging in step 2008, the battery system can switch the switch SW with a duty cycle of the time for selecting the first battery and the time for selecting the second battery is $\eta:1-\eta$ ($0 \leq \eta \leq 1$). The switch SW switching can be performed periodically. Here, $\eta$ can be defined as a predetermined value, or by using the method of FIG. 21, or can be changed by the voltage and current at which $\eta$ is measured.

Next, the switch SW selection process in CC charging of FIG. 20 will be described with reference to FIG. 21. The purpose of this process is to give one battery a rest by alternately switching the batteries, in order to reduce the polarization voltage, increase the next charging current, increase the total CC charging time, and thus increase the stored charge in the regeneration.

First, in step 2101, the battery system determines whether the estimated current of the first battery is less than the CC charging current Ia. When the estimated current of the first battery is less than Ia, the battery system moves the process to step 2102, and otherwise, moves the process to step 2103.

In step 2102, the battery system transmits an instruction to select the switch SW to the first battery. More specifically, the battery system turns on the switch SW205 and turns off the switch SW210. Then, the battery system ends the process of the steps in FIG. 21 (the battery system moves the process to step 2007 of FIG. 20).

In step 2103, the battery system transmits an instruction to select the switch SW to the second battery. More specifically, the battery system turns off the switch SW205 and turns on the switch SW210. Then, the battery system ends the process of the steps in FIG. 21 (the battery system moves the process to step 2007 of FIG. 20).

Figure 20:
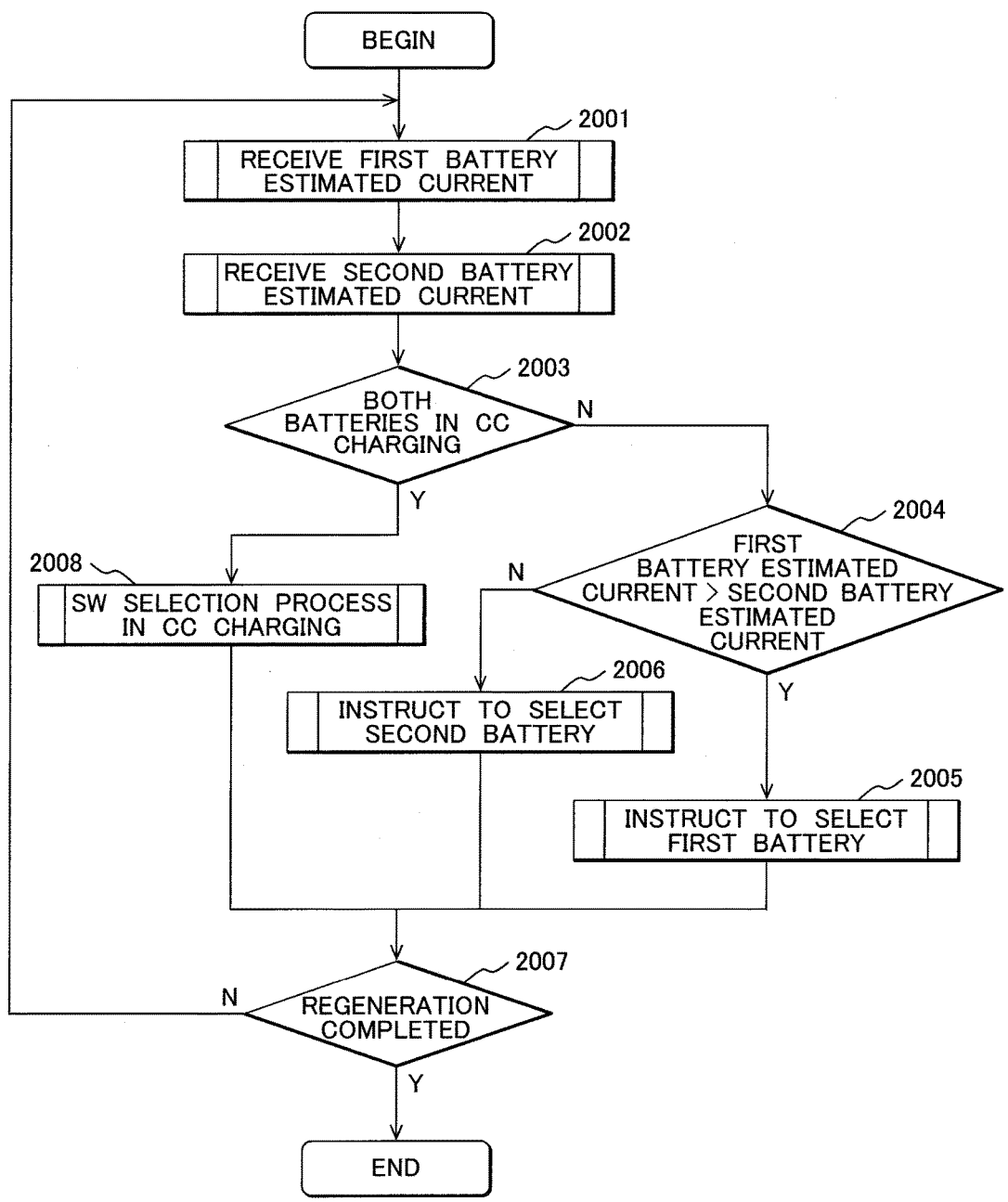
FIG. 20 is a diagram of another example of the switch control during the regenerative charging.
Figure 21:
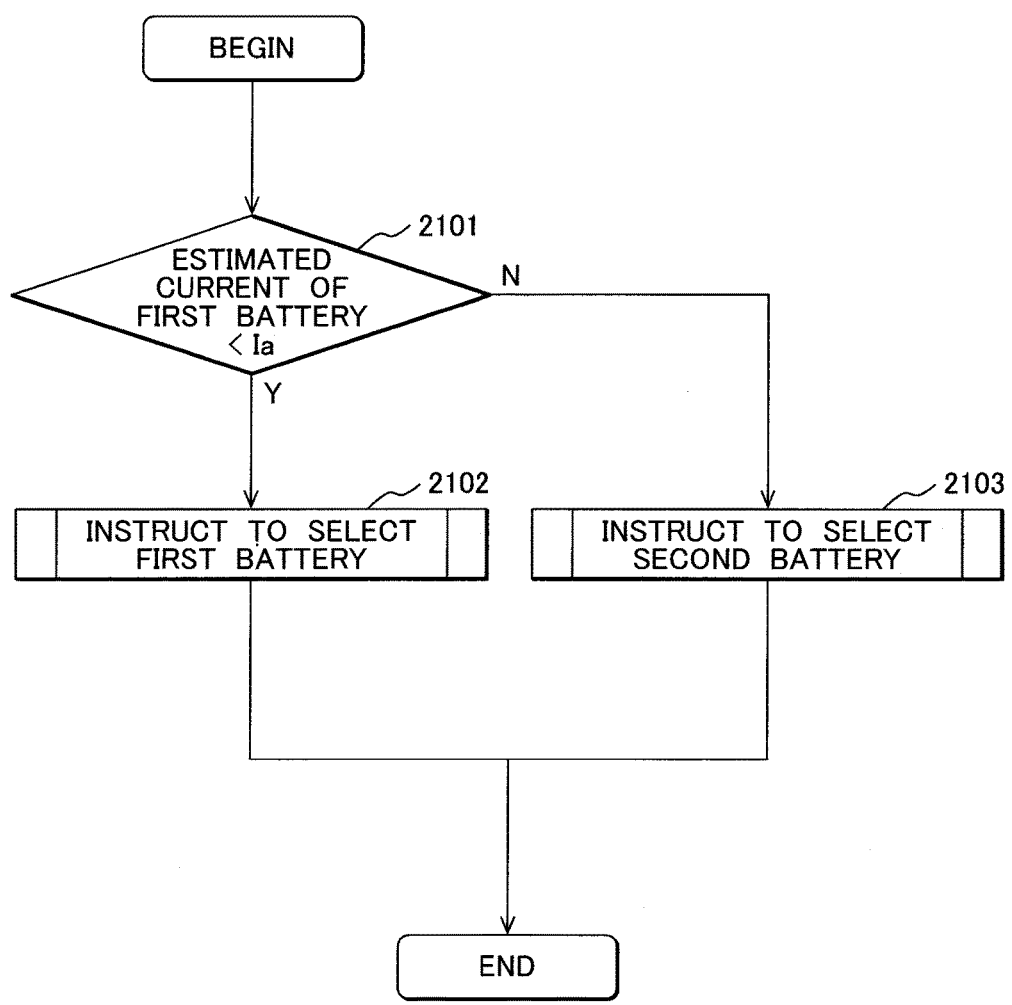
FIG. 21 is a diagram of an example of a switch SW selection process in a constant current charging.

In the loop of the process of FIGS. 20 and 21, the CC charging of the first battery is first completed. Then, it is assumed that the second battery is charged with CC for $\Delta t$ (this is equivalent to giving the first battery a rest). During this time, the polarization voltage of the first battery is reduced by $\Delta t \times vp/cLrL$ (vp is the polarization voltage when the CC charging is completed, of is the polarization capacity, and rf is the polarization resistance). Thus, when the battery system next switches to the first battery, the first battery can be charged with CC by $\Delta t \times vp/(Ia*rL-vp)$. As a result, the CC charging time of the first battery is further increased, and as a result, the stored charge is increased. Further, the first and second batteries are switched with the duty cycle ratio of the ON time of the first battery and the ON time of the second battery, $vp:Ia*rL-vp$. Note that the reason why the CC charging of the battery is prioritized is first described below.

If the CC time $\kappa$ due to battery switching is approximated to FIG. 18 under the assumption that the switch SW is frequently switched, the time rate at which the first battery is turned on is η, the time when the CC charging of the first battery is first completed is λ, the equivalent circuit of the first battery is as shown in FIG. 16, and the polarization of the second battery is ignored, κ can be approximated from Equation 18 by solving the circuit equation.

$$\kappa = \frac{(V_a - I_a R_o - V_a(0)) + \int_0^\lambda \eta(t)\,dt - \lambda \frac{V_P}{I_a r_L}}{\left(1 - \frac{v_P}{I_a r_L}\right) I_a} \quad \text{(Equation 18)}$$

From Equation 18, the maximization of κ is equivalent to the maximization of Equation 19.

$$\int_0^\lambda \eta(t)\,dt - \lambda \frac{v_P}{I_a r_L} = \int_0^\lambda \left\{\eta(t) - \frac{v_P}{I_a r_L}\right\} dt \quad \text{(Equation 19)}$$

Equation 19 is equivalent to maximizing Equation 20 from the circuit equation of FIG. 16.

$$\frac{c_L}{I_a}(v_P - v_L(0)) + \frac{1}{I_a r_L} \int_0^\lambda \{v_L(t) - v_P\}\,dt \quad \text{(Equation 20)}$$

vL(t): Polarization voltage of first battery (<vp)

Equation 20 can be maximized by approximating vL to vp at full speed from vL−vp<0. Thus, the battery system first connects to the first battery in order to approximate the polarization voltage of the first battery to vp at full speed.

Here, η=vp/Ia*rL under the assumption that η is a duty cycle of the first battery after the first battery first reaches vp, so that it is possible to obtain the polarization resistance rL from the result obtained by observing the duty cycle η in the controller 200 to hold the value (vp=Va−VL−Ia*RL, rL=vp/(Ia*η)).

The next will describe the case of changing the duty cycle η by the measured voltage and current (basically when a small capacity battery is used for the second battery). Here, a description will focus on the following two cases: the idea of controlling the polarization voltage of the large capacity battery (first battery); and the idea of controlling the OCV of the small capacity battery (which is the voltage 171 in the second battery in FIG. 17, which corresponds to Voltage of small capacity battery−IaRs).

In the former case, η can be determined as Equation 21 in which the voltage time rise rate of the first battery is m1 (with a limiter at 0≤η≤1 provided). Equation 21 can be derived from the circuit equation under the assumption that a current of substantially η*Ia flows to the polarization.

$$\eta = \frac{c_L}{I_a} m_1 + \frac{v_p(t)}{I_a r_L} \quad \text{(Equation 21)}$$

Vp(t): Polarization voltage of first battery=First battery terminal voltage−Ia*RL−VL In the latter case, η can be determined as Equation 22 in which the voltage time rise rate of the small capacity battery is m2 (with a limiter at 0≤η1 provided). This equation is derived from the circuit equation under the assumption that a current of substantially (1−η) Ia flows to the polarization.

$$\eta = 1 - \frac{m_2 + \frac{v_s(t)}{c_s r_s}}{\left(\frac{1}{C} + \frac{1}{c_s}\right) I_a} \quad \text{(Equation 22)}$$

Vs(t): Polarization voltage of second battery=Second battery terminal voltage−Ia*Rs−Steady state OCV of second battery C: Capacitance [F] corresponding to gradient of OCV (SOC)

Here, if it is wanted to match the completion time of the CC charging of the first battery and the completion time of the CC charging of the second battery from the time t1, the relationship between m1 and m2 can be represented by Equation 23.

$$\frac{m_1}{V_a - I_a R_L - V_L - v_p(t_1)} = \frac{m_2}{V_a - I_a R_s - V_2(t_1)} \quad \text{(Equation 23)}$$

Vs(t1): OCV of second battery at time t1 (including polarization)

The denomination of Equation 23 is "OCV when CC charging is completed−Current OCV". Here, Vs (t1) can be defined as the voltage when the switch SW210 of the second battery is OFF, or Second battery terminal voltage−IaRa when the switch SW is ON.

Here, if A(t) is defined as Equation 24 from Equation 23, m1 and m2 are given by Equation 25.

$$A(t) = \frac{V_a - I_a R_s - V_2(t_1)}{V_a - I_a R_L - V_L - v_p(t_1)} \quad \text{(Equation 24)}$$

$$m_1 = \frac{I_a - \frac{v_s(t)}{\left(1 + \frac{c_s}{C}\right) r_s} - \frac{v_p(t)}{r_L}}{c_L + \frac{C c_s}{C + c_s} A(t)} \quad \text{(Equation 25)}$$

$$m_2 = A(t) m_1$$

Preferably m1 and m2 are non-negative values and are as small as possible, so that η can be set with m1=0 in Equation 21, after A(t)=∞ (namely, after vp(t)=vp) or after Ia=vs(t)/(rs*(1+cs/C))+vp(t)/rL is true (however, vp(t) should be non-negative). Note that the condition in which vp(t)=vp is the same as in the case in which only the first battery is first connected to complete the CC charging.

Here, after Ia=vs(t)/(rs*(1+cs/C))+vp(t)/rL is true, the CC charging time can be increased infinitely by switching between the switches (practically, the time is finite because the OCV of the large capacity battery varies, however, the CC charging time can be sufficiently increased if the regeneration time is, for example, about 10 s), and the stored charge is the maximum. For this reason, η can be controlled to first satisfy Ia=vs(t)/(rs*(1+cs/C))+vp(t)/rL. As the control method, in order to reduce both voltage rises based on the circuit equation given in Equation 26, η is determined so as to minimize the control target $(dv_p(t)/dt)^2 + \text{const} \cdot (dV_s(t)/dt + dv_s(t)/dt)^2 = (I_a \eta / c_L - v_p / c_L r_L)^2 + \text{const} \cdot (-I_a \eta / c_s + I_a (1/c_s + 1/C) - v_s / c_s r_s)^2 \propto (\eta - v_p / I_a r_L)^2 + \text{const} \cdot ((1 + c_s/C)(\eta - 1) + v_s / c_s r_s)^2$ For the controller for determining η, the modern control theory can be used.

State Equation:

$$\begin{pmatrix} \frac{dv_P(t)}{dt} \\ \frac{dv_S(t)}{dt} \end{pmatrix} = -\begin{pmatrix} \frac{1}{c_L r_L} & 0 \\ 0 & \frac{1}{c_L r_L} \end{pmatrix} \begin{pmatrix} v_p(t) \\ v_s(t) \end{pmatrix} + \begin{pmatrix} \frac{I_2}{c_L} \\ -\frac{I_a}{c_s} \end{pmatrix} \eta + \begin{pmatrix} 0 \\ \frac{I_a}{c_s} \end{pmatrix}$$ (Equation 26)

$$\frac{dV_s(t)}{dt} = (1-\eta)\frac{I_a}{C}$$

Observation Equation:

$$V_1(t) = V_L + I_a R_L + v_p(t)$$

$$V_2(t) = V_s(t) + I_a R_s + v_s(t)$$

$$V'_1(t) = V_L + v_p(t)$$

$$V'_2(t) = V_s(t) + v_s(t)$$

V1(*t*): Measured voltage of first battery (when switch SW205 is ON)
V2(*t*): Measured voltage of second battery (when the switch SW210 is ON)
V1'(*t*): Measured voltage of first battery (when the switch SW205 is OFF)
V2'(*t*): Measured voltage of second battery (when the switch SW210 is OFF)
Constraint: $0 \le \eta \le 1$ $$v_p(t) \le V_a - I_a R_L$$

$$v_s(t) + V_s(t) \le V_a - I_a R_s$$

After the condition of Ia=vs(t)/(rs*(1+cs/C))+vp(t)/rL is satisfied, it is fixed to η( η=vp(t)/Ia*rL) with m1=0 in Equation 21. Note that there may be the case in which the controllability condition is not satisfied and Ia=vs(t)/(rs*(1+cs/C))+vp(t)/rL is not true by any means. For example, due to the voltage constraint, it necessarily results in Ia>vsm/(rs*(1+cs/C))+vp/rL (vsm is the upper limit of polarization voltage of small capacity battery=Ia*rs*(1−exp(−κ/(cs*rs)))+vs(0)*exp(−κ/(cs*rs)), κ is represented by κ in Equation 12, or cl*rL=cs*rs. In this case, as described above, it is possible to first satisfy vp(t)=vp and then η=vp/Ia*rL, or it is possible to use the following method.

As one of other methods for increasing the CC charging time, it is possible to control the switching of the switch SW in such a way that the second battery alone is first charged with CC, and when the second battery alone is no longer charged with CC, the duty cycle is determined as with m2=0 in Equation 22.

Third Embodiment

Figure 22:
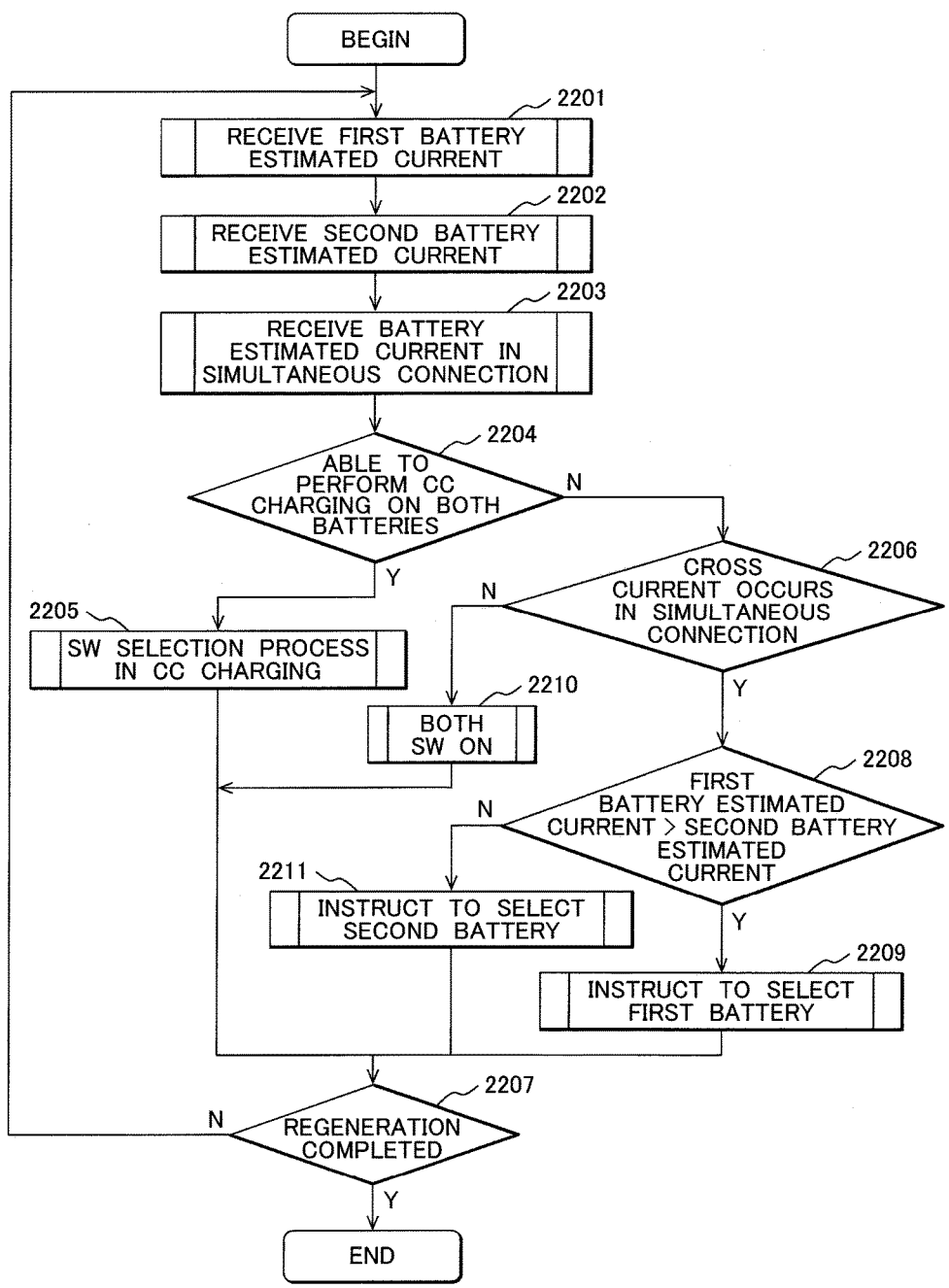
FIG. 22 is a diagram showing another example of the switch control during the regenerative charging time.

The flow of the third embodiment in the micro BEV of the present invention will be described with reference to FIG. 22. The third embodiment is designed to perform switching two or more times during the time from the start of the regeneration to its completion, while being able to connect both batteries to charge them at the same time. After completion of the CC charging described in the second embodiment, the battery system turns on the switches of the two batteries. In addition, at this time, the battery system constantly monitors a cross current, and if a cross current occurred, combines a control, such as turning on the switch SW of only one battery with the charging current quickly increased. Thereby the battery system can prevent the cross current.

This example is the case in which simultaneous connection of the batteries is permitted during the regenerative charging in order to increase the charging current in the regeneration (the remaining processes are the same as the first embodiment). In other words, the battery system performs FIG. 22 instead of FIG. 15 in the first embodiment.

First, in step 2201, the battery system estimates the charging current i1 when only the first battery is connected. This is the same method described in the second embodiment.

Next, in step 2202, the battery system estimates the charging current i2 when only the second battery is connected. This is the same method as described in the second embodiment.

Next, in step 2203, the battery system estimates each of the charging currents (I1 for the first battery current, and I2 for the second battery current) when both the first and second batteries are connected. This method will be described. The equivalent circuit when both batteries are connected is as shown in FIG. 6. Since the discharging direction is positive in FIG. 6, it is possible to calculate I1 and I2 by reversing the sign of the current (during CC charging). However, i1=I1 and i2=I2 during CV charging, so that the values of i1 and i2 are used. As for the determination of CV charging, if the voltage V in FIG. 6 is equal to or greater than Va (CV voltage of the alternator), the battery system determines that this is the CV charging. Here, the battery system estimates the DC resistance, the ON resistance of the switch SW, and the OCV of each battery by the method described in the first embodiment. Here, when both switches SW are currently turned on, the measured currents can be used.

Next, in step 2204, the battery system determines whether i1 and i2 are both equal to or greater than the CC charging current Ia (whether both the first and second batteries are charged with CC when only the first or second battery is used). If both batteries are charged with CC charging when either of the batteries is connected, the battery system moves the process to step 2205, and otherwise, moves the process to step 2206.

In step 2205, the battery system performs the switch SW selection process during CC charging (the same process as the process during CC charging shown in FIG. 21 described in the second embodiment), and moves the process to step 2207.

In step 2206, the battery system determines whether a cross current occurs in simultaneous connection. If a cross current occurs, the battery system moves the process to step 2208, and otherwise, moves the process to 2210. This determination method is under assumption that I1<0 or I2<0.

In step 2208, since the cross current occurs in simultaneous connection, the battery system determines that which of the two batteries should be selected. When the estimated current of the first battery is greater than the estimated current of the second battery, the battery system moves the process to step 2209, and otherwise, moves the process to step 2211.

In step 2209, the battery system transmits an instruction to select the first battery (by turning on the switch SW205 and turning off the switch SW210), and then moves the process to step 2207.

In step 2211, the battery system transmits an instruction to select the second battery (by turning off the switch SW205 and turning off the switch SW210), and then moves the process to step 2207.

In step 2210, the battery system transmits an instruction to select both batteries (by turning on the switch SW205 and the switch SW210), and then moves the process to step 2207.

In step 2207, the battery system determines whether the regeneration is completed. If the regeneration is not completed, the battery system moves the process to step 2201, and otherwise (if completed), ends the process of FIG. 22.

Note that I1+I2>i1, i2 is generally true, so that the comparison process between i1, i2 and I1+I2 is omitted. However, the comparison process can be added as well.

Further, in the above description, when it is difficult to continue CC charging of either of the batteries alone, it is possible to continue the CC charging by connecting both batteries. Thus, the stored charge is increased.

Next, in step 2205, it is possible to add a process that allows for simultaneous ON during the CC charging. This method will be described. The method yields the following equation: Time for connecting only first battery: Time for connecting only second battery: Time for connecting both batteries=$\eta$:$\zeta$:1−$\eta$−$\zeta$ (0<$\eta$, $\zeta$<1. Further, $\eta$ and $\zeta$ can be controlled according to given values.

Next, when the parameters (C, cs, rs) of the small capacity battery are not set in the table, it is necessary to identify the parameters (the DC resistance can be identified by the method described above, and the case of the large capacity battery has been described using Equation 9). This identification method will be described. Note that for the capacitor, the setting method is the same as setting rs=0, C=Cs, and Rc=Rs, so that the case of using the capacitor for the second battery is omitted. As for the identification timing, there are two cases: when the battery is charged with CC; and when the battery is charged with CV. However, because control is included in CC charging and because there is no interaction between the batteries even when the batteries are connected in parallel to the constant voltage source in CV charging, the parameter identification in CV charging will be described here.

When the small capacity battery is charged with CV, the equation is represented by Equation 27.

$$V_a = I(t)R_\lambda + v_s(t) + V_s(0) + \frac{1}{C}\int_0^t I(t)\,dt \qquad \text{(Equation 27)}$$

$$c_s r_\lambda \frac{dv_s(t)}{dt} + v_s(t) = r_s I(t)$$

I(t): Measured current

Thus, the linear format of Equation 28 is true for the unknown parameters C, rs, and cs.

$$xI(t) + yQ(t) + zF(t) = G(t) \qquad \text{(Equation 28)}$$

$$Q(t) = \int_0^t I(t)\,dt$$

$$F(t) = \int_0^t Q(t)\,dt$$

$$G(t) = (V_a - V_s(0))t - R_s Q(t)$$

$$x = c_s r_s R_s$$

$$y = \left(\frac{c_s}{C} + 1\right)r_s$$

$$z = \frac{1}{C}$$

In Equation 28, x, y, z can be obtained using the least squares or recursive least squares and then C, cs, rs can be obtained from x, y, z. For the case of the capacitor, C can be obtained similarly using the least squares or recursive least squares in Equation 28 in which x=y=0.

The next will describe the method for obtaining unknown parameters VL, ct, at of the large capacity battery. The difference from the case of the small capacity battery is in that G(t) in Equation 28 is given by VL*t−RL*Q(t) with C=infinity, namely, z=0 and y=rs, which is expressed as Equation 29.

$$XI(t)+r_s Q(t)-V_L t = -R_s Q(t) \qquad \text{(Equation 29)}$$

In Equation 29, x, rs, VL can be obtained using the least squares or recursive lest squares and then cs can be obtained from x. Note that the parameter identification described above is for the case of charging, but the battery parameters may be different in charging and discharging depending on the battery. In this case, the battery parameters can be identified in the same manner by using data in discharging.

Figures 23, 24:
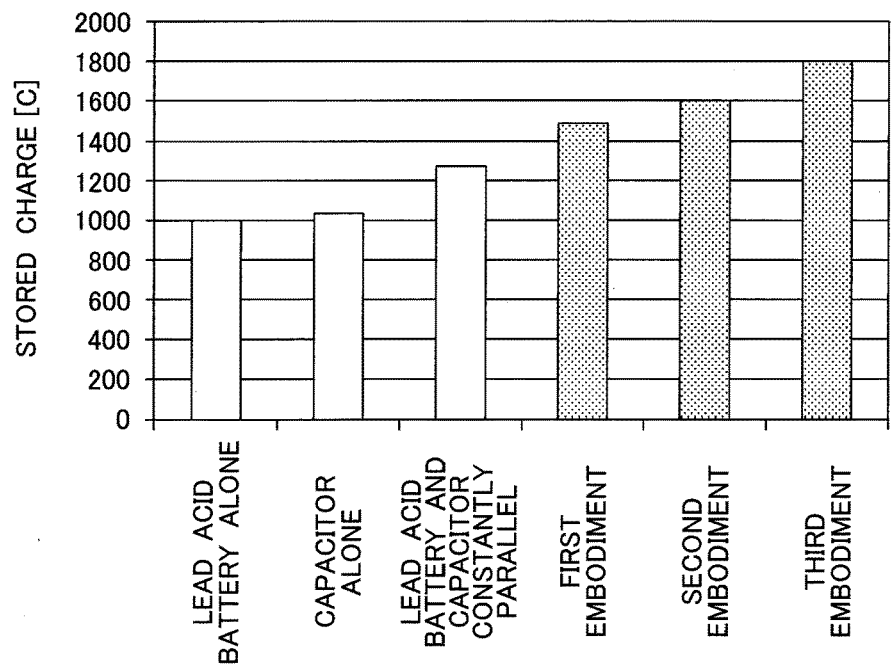
FIG. 23 is a diagram of an example of the specifications of the batteries.
FIG. 24 is a diagram showing a comparison of effects of a stored regenerative charge.

Finally, the comparison of the effects of stored charge during regenerative charging described above will be described. Here is an example in which a lead acid battery is used for the first battery and a capacitor (a lithium ion capacitor) is used for the second battery, with the parameters assumed as shown in FIG. 23. Then, it was assumed that the alternator had CC charging 200 A, the CV charging voltage was 14 V, the duration of the regeneration was 10 s, and the switch resistance was 0. Then, the following cases are compared: the lead acid battery alone; the capacitor alone; the constant parallel between the lead acid battery and the capacitor (in other words; the initial OCV of the lithium ion capacitor is 12.6 V which is the same as the lead acid battery); the switch SW one-time switching method that is described in the first embodiment; the method without simultaneous connection that is described in the second embodiment (however, the method first charges the lead acid battery and switches to $\eta$=vp/Ia*rL at the time when the polarization of the lead acid battery is vp. This is simply referred to as the second embodiment); the method with simultaneous connection that is described in the third embodiment (however, the method first charges the lead acid battery in CC charging and switches to $\eta$=vp/Ia*rL at the time when the polarization of the lead acid battery is vp, and the simultaneously connects the batteries after the CC charging of only one battery is no longer possible. This is simply referred to as the third embodiment). FIG. 24 shows the comparison results of calculating values using a time step size of 50 ms. From FIG. 24, the use of the proposed methods (the first to third embodiments) results in an increase in the amount of stored charge compared to the case of battery alone and constant parallel. Further, the amount of stored charge is the largest in the third embodiment. This is because the CC charging time is increased since the simultaneous connection is permitted. Note that the level of the stored charge is low in the constant parallel because the initial voltage of the capacitor is low at 126 V and the amount of charge that can be stored in the capacitor is reduced.

Fourth Embodiment

The fourth embodiment in the micro HEV of the present invention will be described. The present invention is designed to first charge one of the batteries to a voltage at which no cross current occurs, and then switching to parallel connection. As compared to the third embodiment, it is not intended to increase the CC time by using the polarization voltage drop, so that the stored charge is small compared to the stored chard in the third embodiment. However, the number of times the switch SW is switched is reduced, and thereby noise can be reduced.

Figure 25:
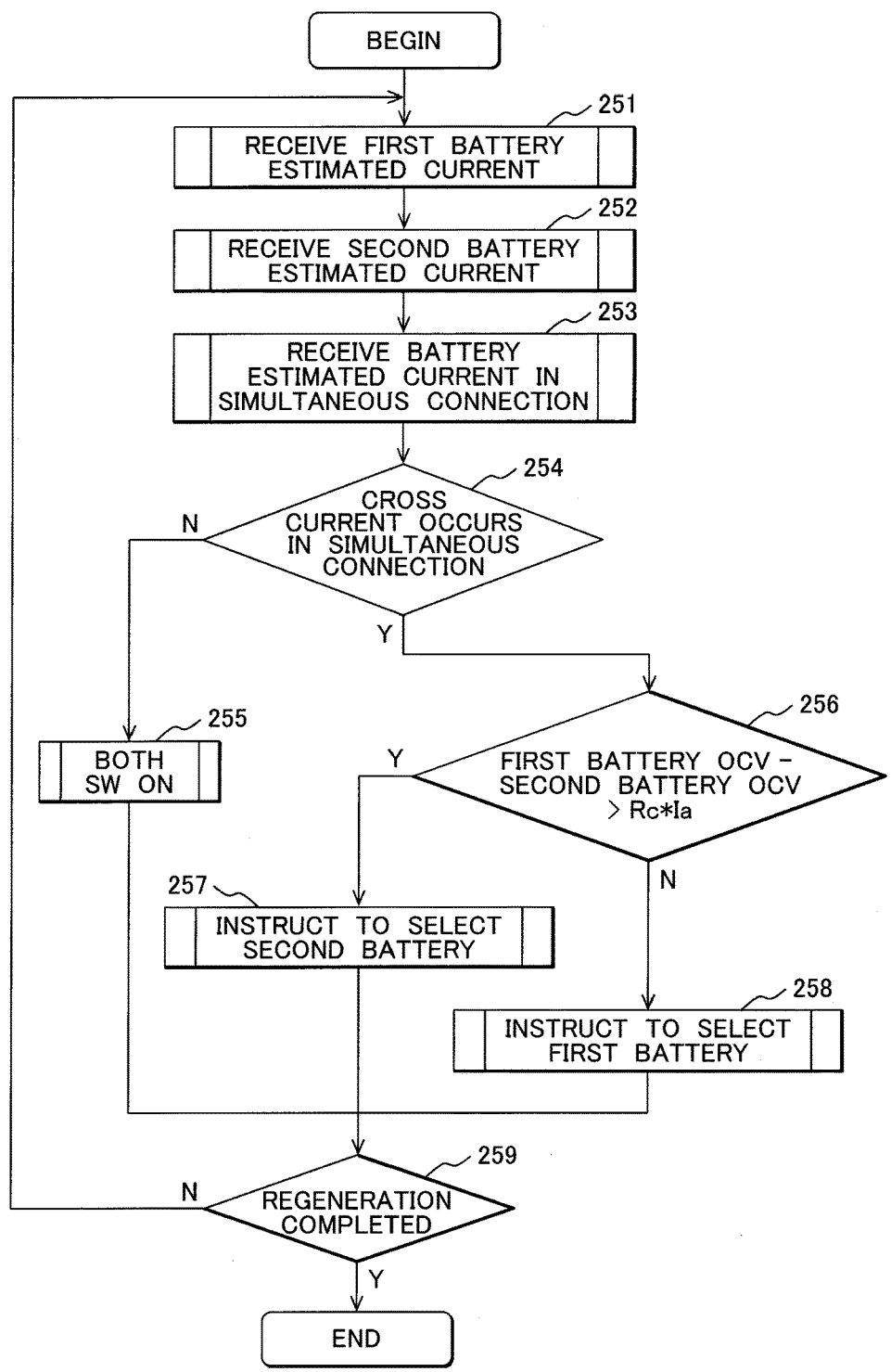
FIG. 25 is a diagram showing a fourth embodiment of the switch control during the regenerative charging.

This process will be described using the follow of FIG. 25. Steps 251 to 253 are the same as 2201 to 2203 in the third embodiment. In step 254, the battery system determines whether a cross current occurs in the simultaneous connection. Then, if no cross current occurs, the battery system moves the process to step 255 to turn on both switches SW. If a cross current occurs, the battery system moves the process to step 256.

In step 256, the battery system determines the condition of lack of voltage of the second battery, namely, "V1−V2>Ia*Rc", in which V1 is the OCV of the first battery (unsteady state value, or the battery voltage at current 0), V2 is the OCV of the second battery (unsteady state value, or the battery voltage at current 0), and Rc is the DC resistance of the second battery. If the voltage of the second battery is insufficient, the battery system moves the process to step 257 and selects the second battery to charge only the second battery. Otherwise the voltage of the first battery is insufficient, so that the battery system moves the process to 258 and selects the first battery to charge only the first battery.

After the switch SW process in steps 255, 257, and 258, the battery system moves the process to step 259 to determine whether the regeneration is completed. If the regeneration is not completed, the battery system returns the process to step 251. If the regeneration is completed, the battery system ends the process of FIG. 25.

REFERENCE SIGNS LIST

11 . . . engine, 12 . . . generator (alternator), 14 . . . auxiliary load, 15 . . . ECU (upper controller), 16 . . . communication line, 17 . . . micro HEV, 200 . . . controller, 201 . . . first battery, 202 . . . ammeter of first battery, 203 . . . voltage sensing line of first battery, 204 . . . current estimation unit of first battery, 205 . . . switch SW of first battery, 206 . . . second battery, 207 . . . ammeter of second battery, 208 . . . voltage sensing line of second battery, 209 . . . current estimation unit of second battery, 210 switch SW of second battery, 211 . . . comparator, 212 . . . SW (switch) control unit, 213 . . . alternator and auxiliary voltage sensing line, 31 . . . step of setting the position of the switch SW . . . during parking, 32 . . . controller sleep step, 33 . . . ignition ON determination, 34 . . . controller wake-up step, 35 . . . regeneration start determination, 36 . . . regenerative charge control step, 37 . . . non-regenerative charge control step, 38 . . . ignition OFF determination, 4 . . . determination during cranking, 42 . . . process step during cranking, 43 . . . cranking start determination, 44 . . . cranking start instruction, 45 . . . alternator charging OFF instruction step, 46 . . . determination of whether second battery is empty, 47 . . . first battery discharge instruction step, 48 . . . second battery discharge instruction step, 501 . . . simultaneous connection determination, 502 . . . determination of less than alternator auxiliary voltage threshold, 503 . . . cross current occurrence determination, 504 . . . cross current occurrence determination in simultaneous connection, 505 . . . simultaneous connection instruction step, 506 . . . voltage comparison determination in single battery connection, 507 . . . instruction step to connect only first battery, 508 . . . instruction step to connect only second battery, 509 . . . determination of whether second battery alone can be used, 510 . . . instruction step to connect only first battery, 511 . . . instruction step to connect only second battery, 81 . . . polarization capacity, 82 . . . polarization resistance, 121 . . . backup capacitor, 1301 . . . first battery ON signal, 1302a . . . second battery ON signal, 1302b . . . OR gate for both batteries OFF determination, 1303 . . . NOT gate for both batteries OFF determination, 1304 . . . signal for both batteries OFF determination, 1305 . . . OR gate for increasing first battery ON period, 1306 . . . delay circuit, 1307 . . . delay circuit, 1308 . . . OR gate for increasing first battery ON period, 1309 . . . OR gate for providing first battery, 1310 . . . pull-up resistance, 1311 . . . first battery gate signal, 1312 . . . second battery gate signal, 141 . . . determination of whether first battery voltage is less than threshold, 142 . . . determination of whether second battery voltage is less than threshold, 143 . . . step of instruction to turn on only first battery, 144 . . . cranking instruction transmission step, 145 . . . determination of whether first battery OCV is above threshold, 146 . . . determination of second battery voltage above threshold, 147 . . . step of instruction to turn on only second battery, 148 . . . engine stop instruction transmission step, 151 . . . step of instruction to select second battery, 152 . . . step of receiving the estimated current time series of first battery, 153 . . . step of receiving the estimated current time series of second battery, 154 . . . switching time calculation step, 155 . . . determination of the time for switching the regeneration elapsed time, 156 . . . regeneration completion determination, 157 . . . second battery selection instruction, 158 . . . regeneration completion determination, 171 . . . small capacity battery OCV, 191 . . . second battery current time series, 192 . . . first battery current time series, 193 . . . switching time, 2001 . . . step of receiving the estimated current of first battery, 2002 . . . step of receiving the estimated current of second battery, 2003 . . . determination of whether CC charging takes place even. in the use of first battery/second battery alone, 2004 . . . determination of comparison between first battery estimated current and second battery estimated current, 2005 . . . step of instruction to select first battery, 2006 . . . second battery step, 2007 . . . regeneration completion step, 2008 . . . step of switch SW selection process in CC charging, 2010 . . . determination of whether the estimated current of first battery estimated current is less than CC current, 2102 . . . first battery selection instruction, 2013 . . . second battery selection instruction, 2201 . . . step of receiving the estimated current of first battery, 2202 . . . step of receiving the estimated current of second battery, 2203 . . . reception of the battery estimated current in simultaneous connection, 2204 . . . determination of whether CC charging takes place even in the use of first battery/second battery alone, 2205 . . . step of switch SW selection process in CC charging, 2206 . . . determination of cross current occurrence in simultaneous connection, 2207 . . . regeneration completion determination, 2208 . . . comparison between first battery estimated current and second battery estimated current, 2209 . . . step of instruction to select first battery, 2210 . . . step of instruction to simultaneously connect both batteries, 2211 . . . step of instruction to select second battery, 251 . . . step of receiving first battery estimated current, 252 . . . step of receiving second battery estimated current, 253 . . . reception of the battery estimated current in simultaneous connection, 254 . . . cross current determination in simultaneous connection, 255 . . . process of connecting both batteries, 256 . . . determination of lack of voltage of second battery, 257 . . . second battery selection instruction, 258 . . . first battery selection instruction, 259 . . . regeneration completion determination

The invention claimed is:

1. A battery system that connects a first battery and a second battery in parallel through a switch, the battery system comprising:

an estimator which estimates a charging current of the first battery at least from an internal resistance of the first battery; and an estimator which estimates a charging current of the second battery at least from an internal resistance of the second battery, wherein the switch is switched between the first battery and the second battery based on the charging current of the first battery and the charging current of the second battery such that a sum of a stored charge in the first battery and a stored charge in the second battery increases, wherein the procedure switches the switch once during a regenerative charging, wherein, in a case that a regeneration time is T, a charging time of the second battery is τ, and a first charging time is T−τ, where T is greater than τ, the second battery first is charged, and the switch is switched to the first battery at the timing τ at which a charge amount of the first battery and a charge amount of the second battery are maximum, and wherein τ is a time t from a start of charge and the switch is switched so as to select the first battery after the time t has elapsed from the start of charge.

2. The battery system according to claim 1,
wherein when the regenerative charging time T is unknown, a time t is obtained at which the current time series of the first battery is equal to the current convergence value of the second battery, and defines the time t as the τ.

3. A battery system that connects a first battery and a second battery in parallel through a switch, the battery system comprising:

an estimator which estimates a charging current of the first battery at least from an internal resistance of the first battery; and an estimator which estimates a charging current of the second battery at least from an internal resistance of the second battery, wherein the switch is switched between the first battery and the second battery based on the charging current of the first battery and the charging current of the second battery by a procedure in which a sum of a stored charge in the first battery and a stored charge in the second battery increases, wherein the switch is switched between the first battery and the second battery two or more times during a regenerative charging, and wherein an estimated charging current of the first battery is compared with an estimated current of the second battery, and the switch is switched so that the battery is selected with the larger of the two estimated currents.

4. The battery system according to claim 3,
wherein the switch is switched at regular intervals and each battery is charged until the individual charging of either the first battery or the second battery attains to a constant voltage charge.

5. The battery system according to claim 4,
wherein a time rate of the switch of the first battery is initially set to 1 when the first battery is charged with a constant current, and the time rate of the switch of the first battery is changed to (voltage in constant voltage charging of alternator−open circuit voltage of first voltage)/(current of alternator during constant current charging×polarization resistance) after the first battery is in a constant current charge completion state.

6. The battery system according to claim 4,
wherein the load is an alternator, and
wherein the time rate of the switch of the first battery is controlled so that the following equation is true when the first battery is charged with a constant current:
Current in constant current charging of alternator=Polarization voltage of second battery/(polarization resistance of second battery*(1+polarization capacity of second battery/capacity of second battery))+Polarization voltage of first battery vp(t)/Polarization resistance of first battery.

7. A battery system that connects a first battery and a second battery in parallel through a switch, the battery system comprising:

an estimator which estimates a charging current of the first battery at least from an internal resistance of the first battery; and an estimator which estimates a charging current of the second battery at least from an internal resistance of the second battery, wherein the switch is switched between the first battery and the second battery based on the charging current of the first battery and the charging current of the second battery by a procedure in which a sum of a stored charge in the first battery and a stored charge in the second battery increases, wherein the procedure switches the switch two or more times during a regenerative charging, wherein when the switch is switched two or more times while a simultaneous connection is permitted during a charging, the charging current of the first battery and the charging current of the second battery for three following cases are estimated: an individual charging of the first battery; an individual charging of the second battery; and connection to both of the first and second batteries, and when the first battery or the second battery discharges, the switch is switched so that the battery with the larger of the two charging currents between the first and second batteries is connected, and otherwise, when a constant voltage charging takes place with the battery alone, both the first and second batteries are connected, and further otherwise, the rate of the switch ON time of the first battery alone, the rate of the switch ON time of the second battery alone, and the rate of the switch time for connecting both batteries are controlled, in order to perform a constant current charging.

8. A battery system that connects a first battery and a second battery in parallel through a switch, the battery system comprising:

an estimator which estimates a charging current of the first battery at least from an internal resistance of the first battery;

an estimator which estimates a charging current of the second battery at least from an internal resistance of the second battery;

wherein the switch is switched between the first battery and the second battery based on the charging current of the first battery and the charging current of the second battery by a procedure in which a sum of a stored charge in the first battery and a stored charge in the second battery increases; and a measurement device that measures a voltage and current of the first battery, a voltage and current of the second battery, and a voltage of the alternator and auxiliary equipment, wherein the DC resistance of the first battery, the resistance of the switch, the polarization capacity, the polarization resistance, the polarization voltage, the open circuit voltage, and the capacity of the second battery are measured; and wherein the parameters are estimated as Polarization voltage=−Polarization voltage before measurement time×(1−measurement time step size/(polarization resistance×polarization capacity))+Measurement current×Measurement time step size/Polarization capacity.

* * * * *